United States Patent
Robinson

[11] Patent Number: 5,845,601
[45] Date of Patent: Dec. 8, 1998

[54] PET LITTER BOX

[75] Inventor: Jerry W. Robinson, Golden Valley, Minn.

[73] Assignee: Pathfinder Innovation, Inc., Minneapolis, Minn.

[21] Appl. No.: 872,959

[22] Filed: Jun. 11, 1997

Related U.S. Application Data

[63] Continuation-in-part of Ser. No. 606,925, Feb. 26, 1996, Pat. No. 5,785,001.

[51] Int. Cl.⁶ ................................................ A01K 29/00
[52] U.S. Cl. .............................................. 119/168
[58] Field of Search .................... 119/168, 499, 119/165, 170; 206/45.23, 45.21; 229/101, 103

[56] References Cited

U.S. PATENT DOCUMENTS

| | | | |
|---|---|---|---|
| 1,125,535 | 1/1915 | Hoffman | 229/101 |
| 1,682,594 | 8/1928 | Benjamin | 119/499 X |
| 2,167,947 | 8/1939 | Hayes | 206/45.21 |
| 3,377,990 | 4/1968 | Mitchell | 119/168 |
| 3,745,975 | 7/1973 | Prucha | 119/165 |
| 4,171,680 | 10/1979 | Silver et al. | 119/165 |
| 4,548,160 | 10/1985 | Feitelson | 119/168 |
| 4,627,381 | 12/1986 | Reed et al. | 119/165 |
| 4,627,382 | 12/1986 | Muzzey | 119/165 |
| 4,706,606 | 11/1987 | Coppola | 119/165 |
| 4,732,111 | 3/1988 | Runion | 119/165 |
| 4,760,816 | 8/1988 | Rhodes | 119/168 |
| 4,779,567 | 10/1988 | Smith | 119/165 |
| 4,807,563 | 2/1989 | Berry et al. | 119/168 |
| 4,884,526 | 12/1989 | Giannakopoulos | 119/165 |
| 5,007,530 | 4/1991 | Weismantel | 206/45.23 X |
| 5,035,205 | 7/1991 | Schiller et al. | 119/168 |
| 5,080,044 | 1/1992 | Bosworth | 119/168 |
| 5,123,381 | 6/1992 | Salmon | 119/165 |
| 5,476,067 | 12/1995 | Queen et al. | 119/168 |
| 5,645,212 | 7/1997 | Potter | 229/101 |
| 5,725,144 | 3/1998 | Stone et al. | 229/101 |

*Primary Examiner*—Robert P. Swiatek
*Assistant Examiner*—Elizabeth Shaw
*Attorney, Agent, or Firm*—Westman, Champlin & Kelly

[57] ABSTRACT

A disposable litter container including container walls perpendicularly coupled to a base for defining an inner cavity of a container. The litter container including a cover hingedly coupled to a container wall for closing the inner cavity of the container for disposal. The container including barriers extendable between a folded position and an upright position for containing litter material within the inner cavity of the container. The cover including a plurality of spaced foldable extents for defining an adjustable height threshold for entry into the inner cavity of the container. Preferably, the container is formed of a unitary structure and adjacent container walls are connected to form the container. The connection of adjacent container walls of the present invention are designed to retain moisture within the inner cavity. In one embodiment of the invention the container walls are designed for collapse to define a generally flat structure for storage and transport.

17 Claims, 30 Drawing Sheets

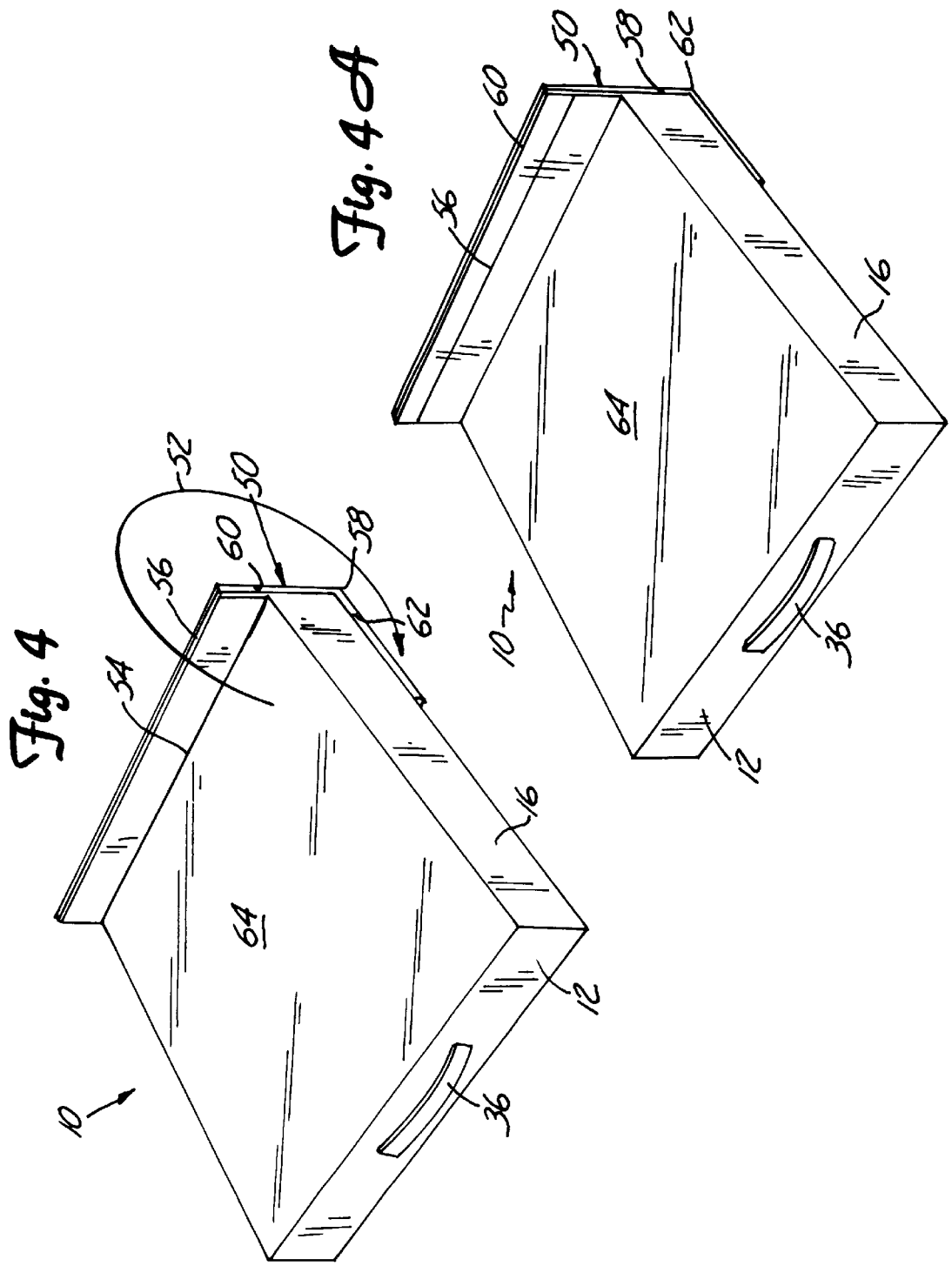

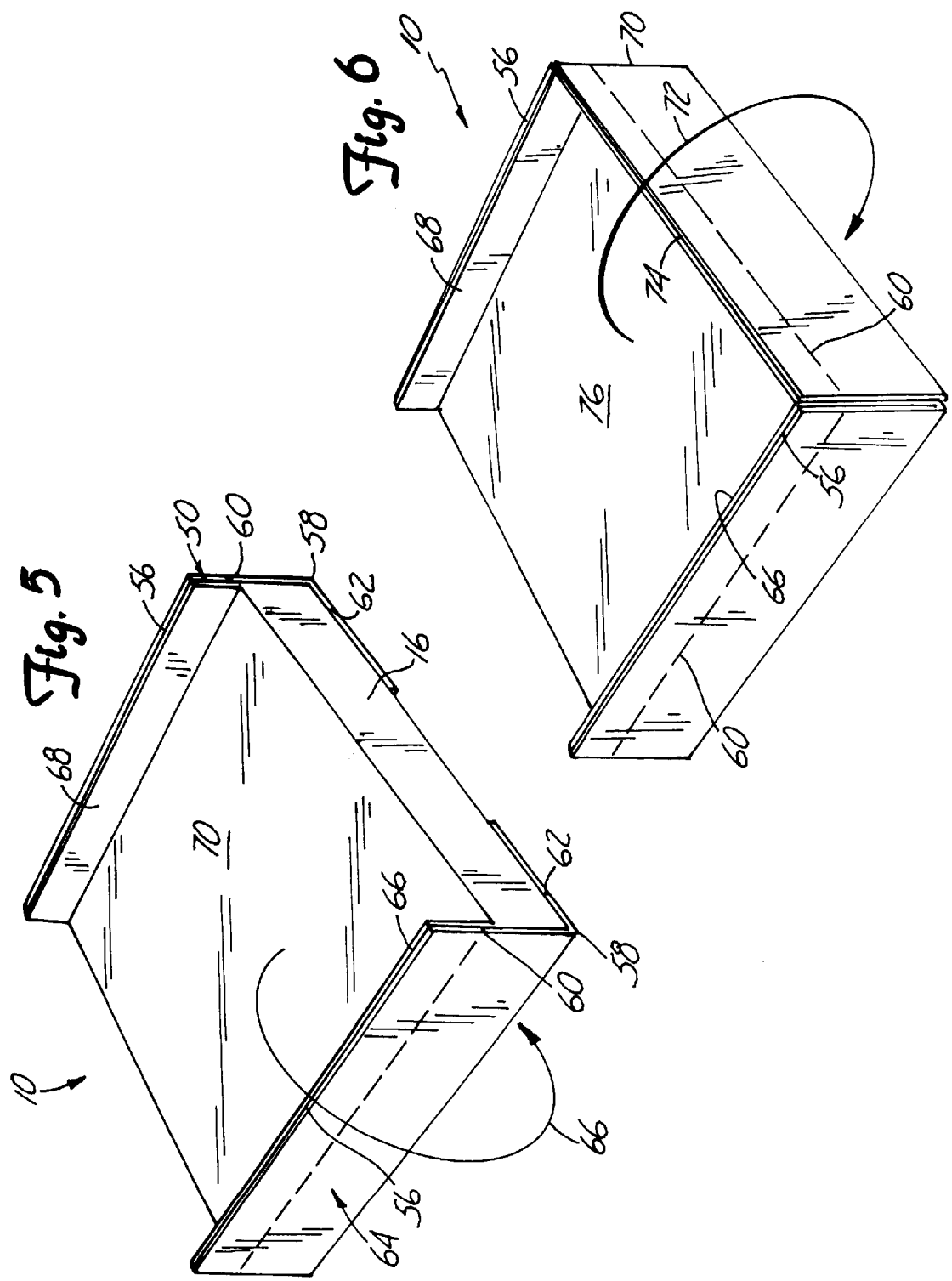

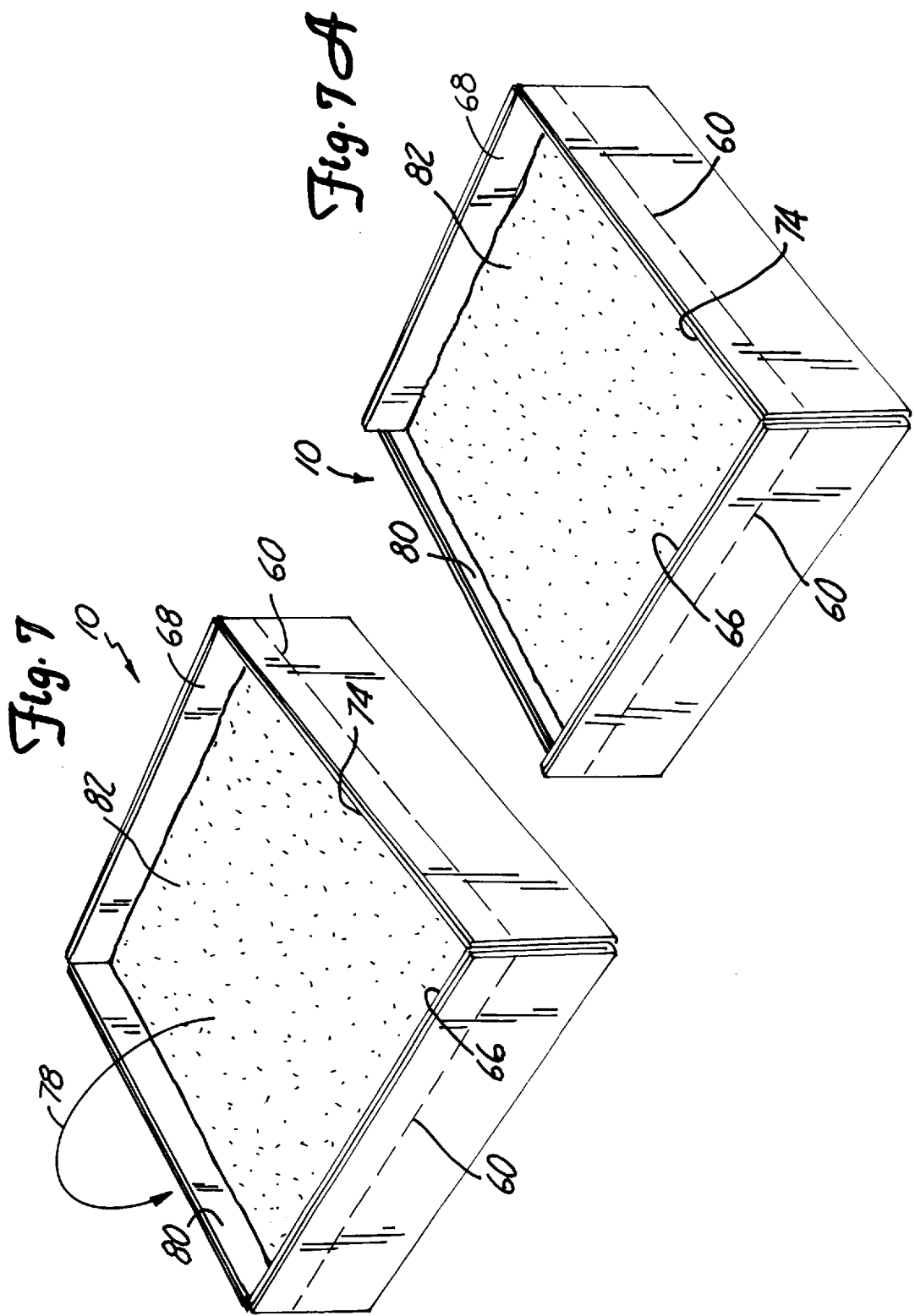

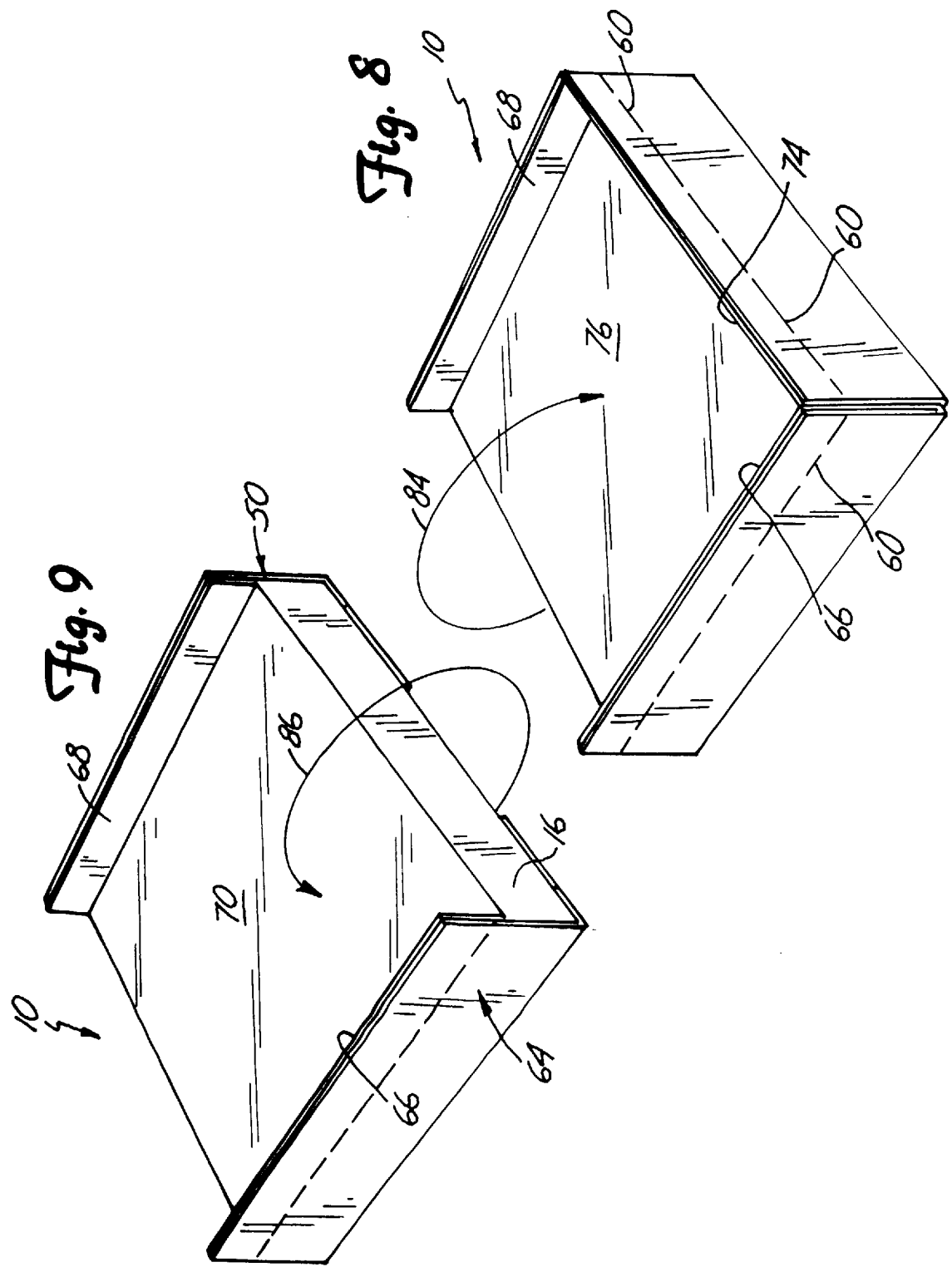

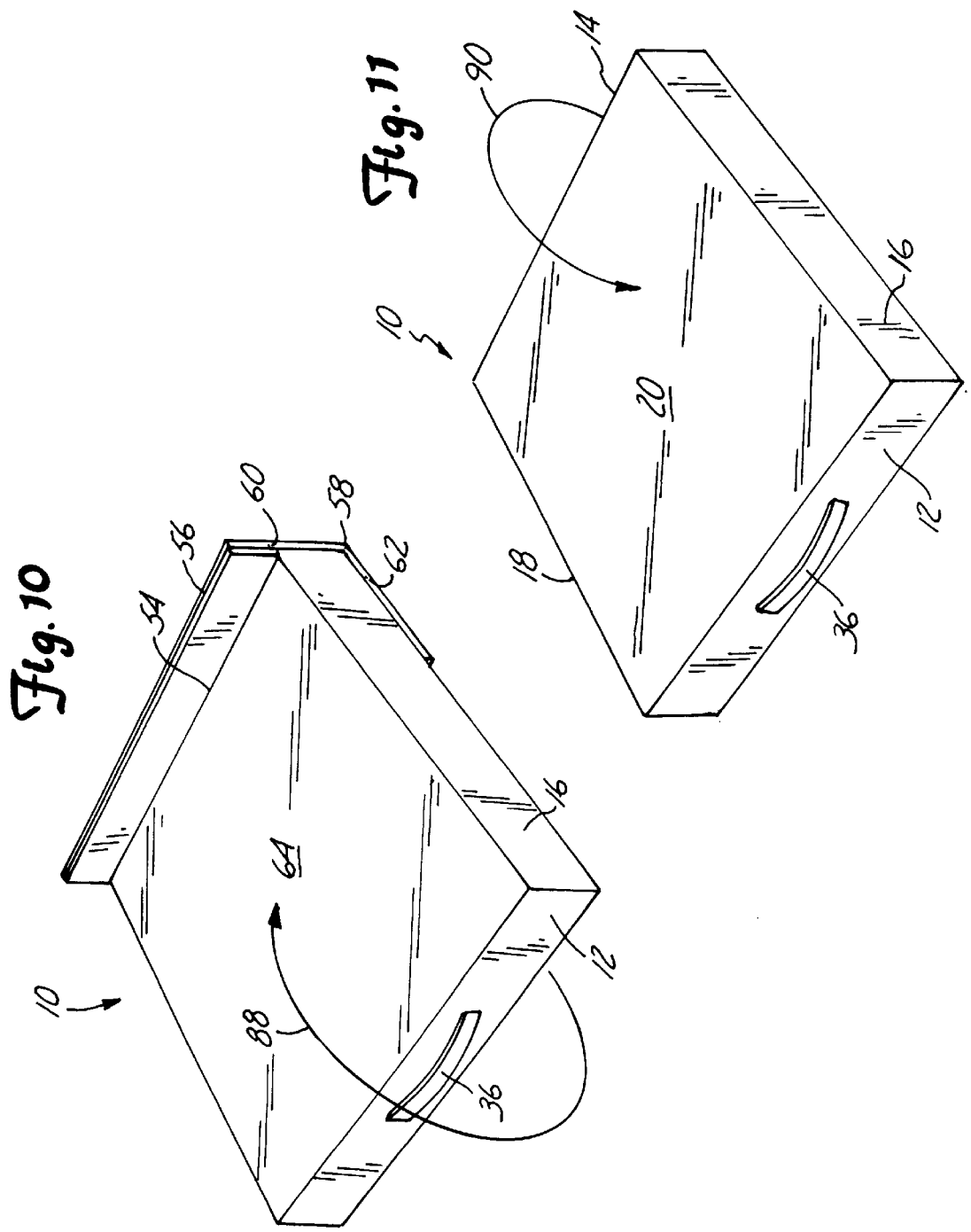

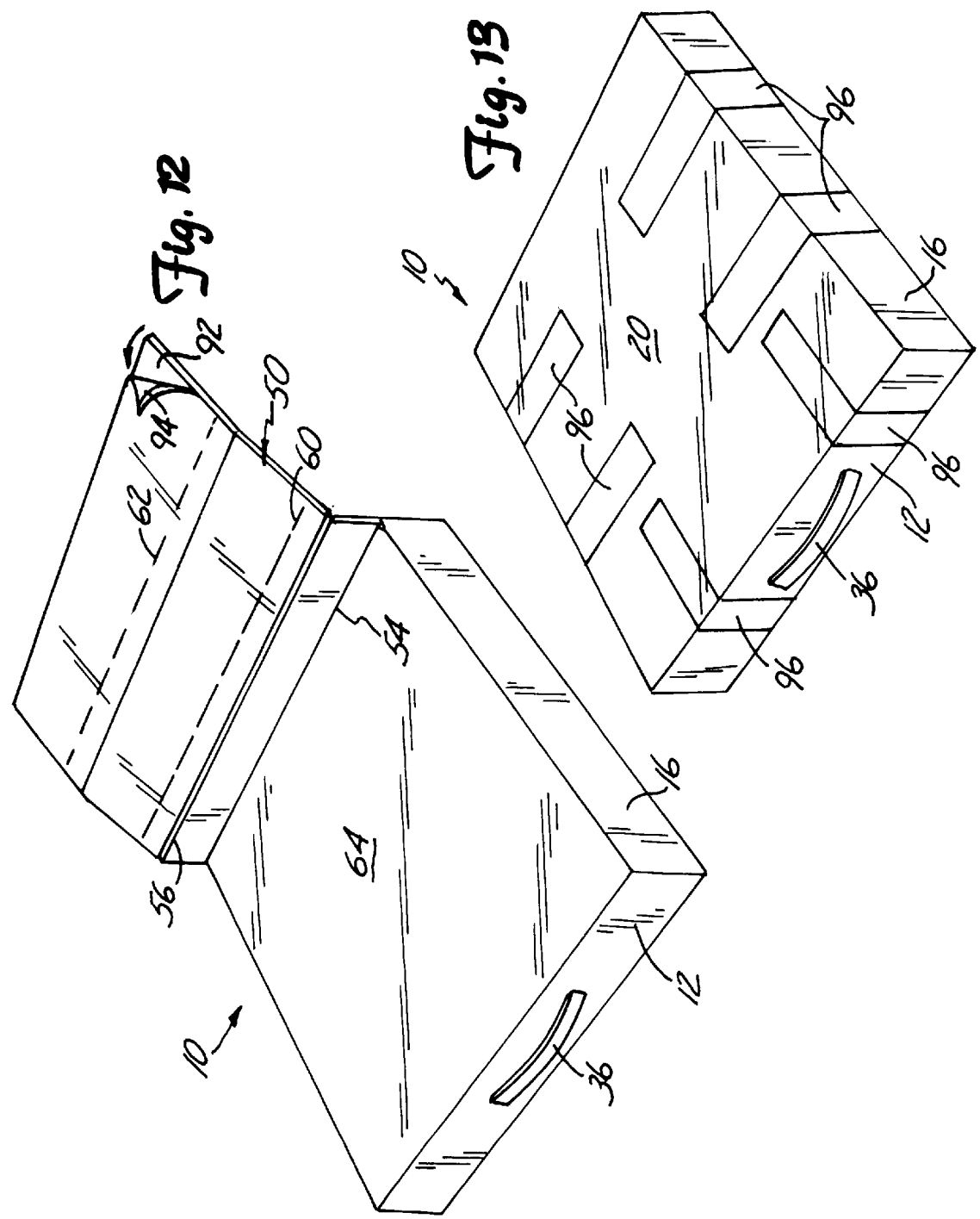

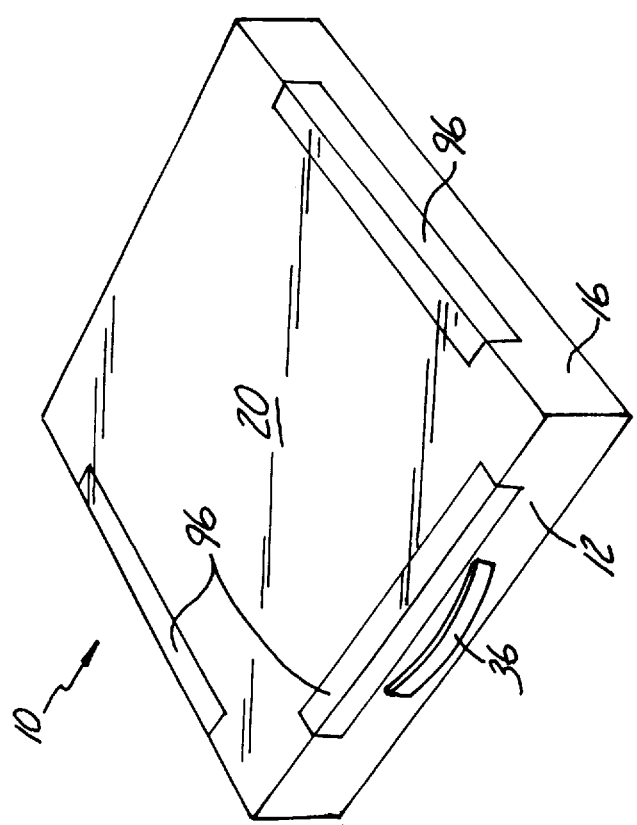

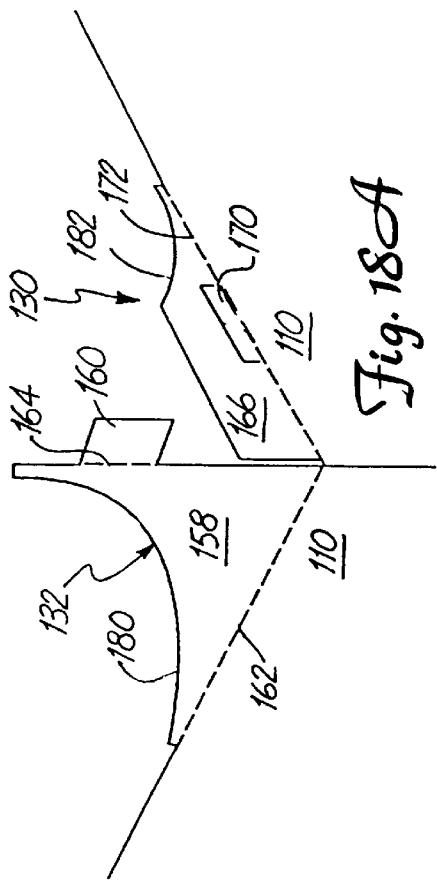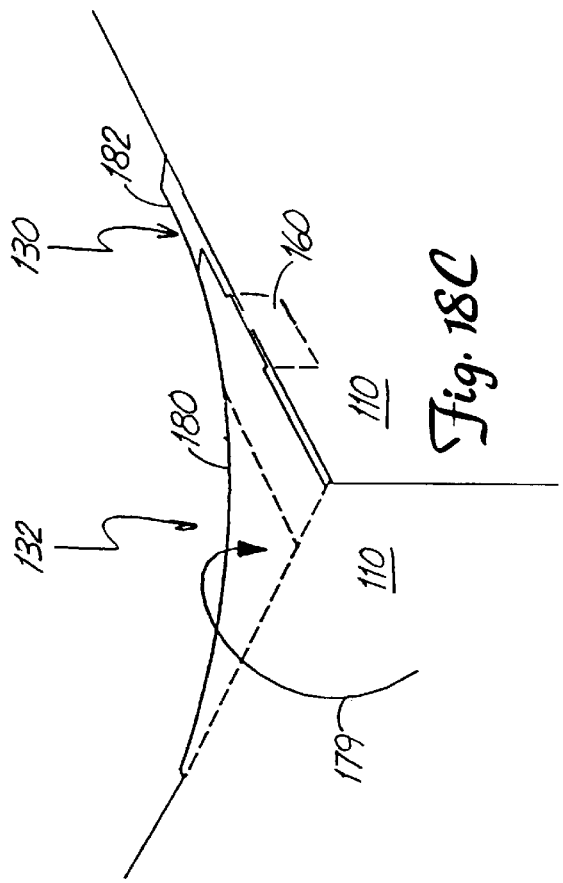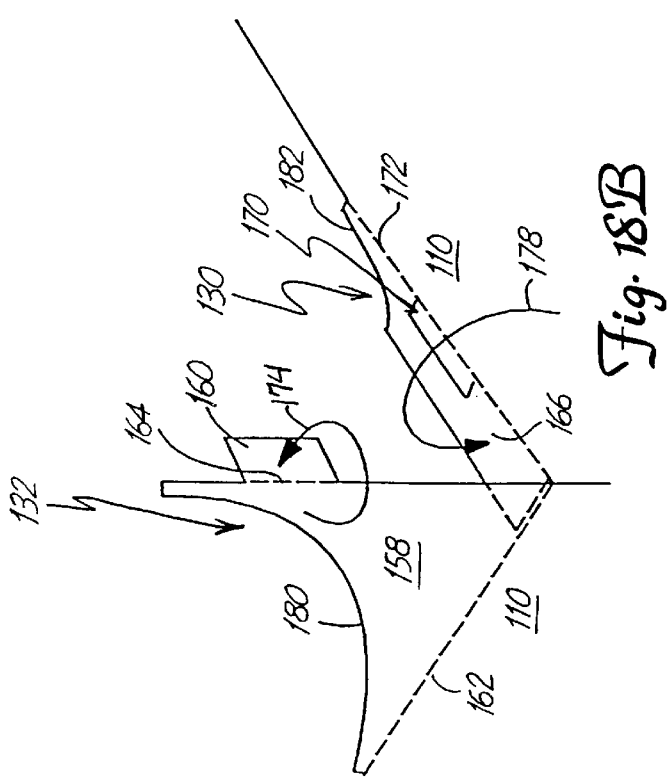

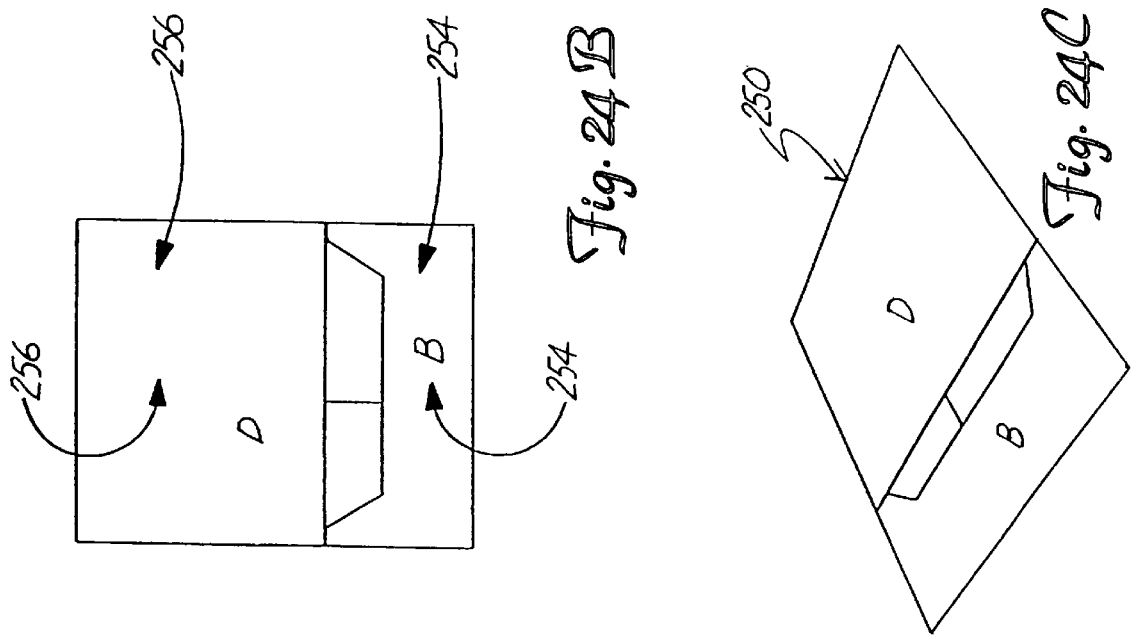
Fig. 24B
Fig. 24C
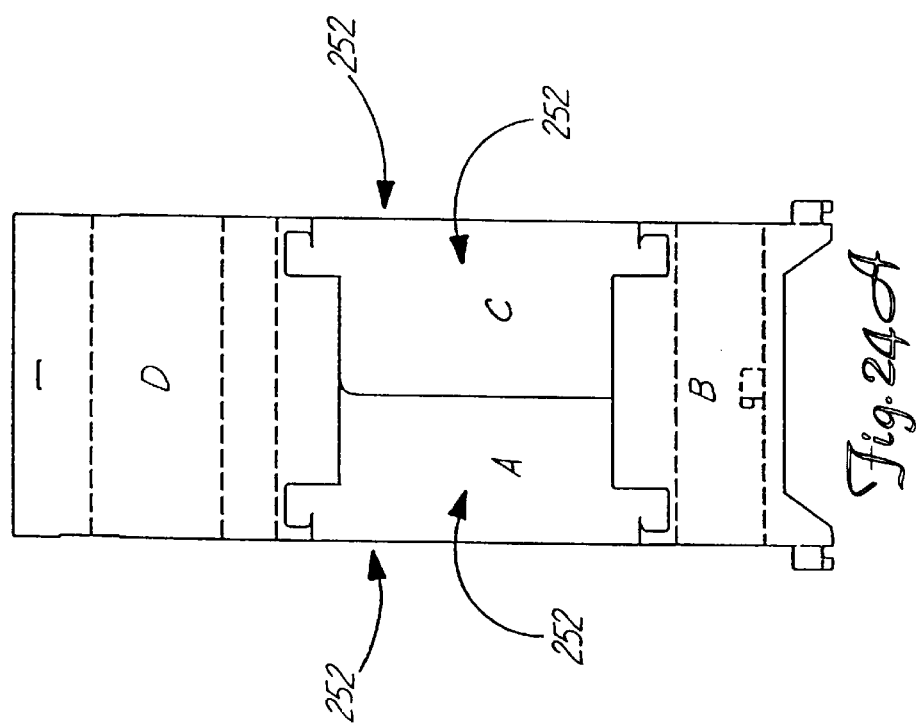
Fig. 24A

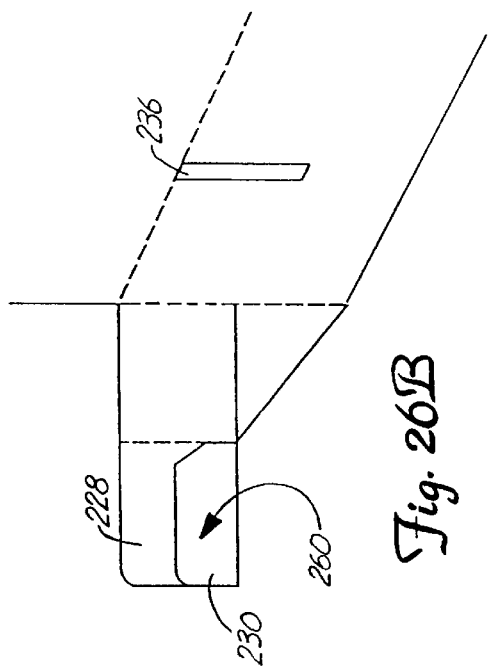
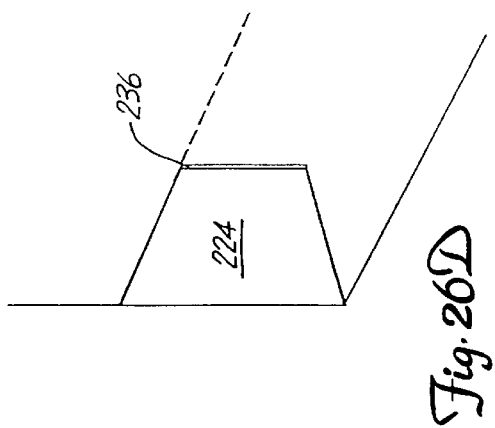
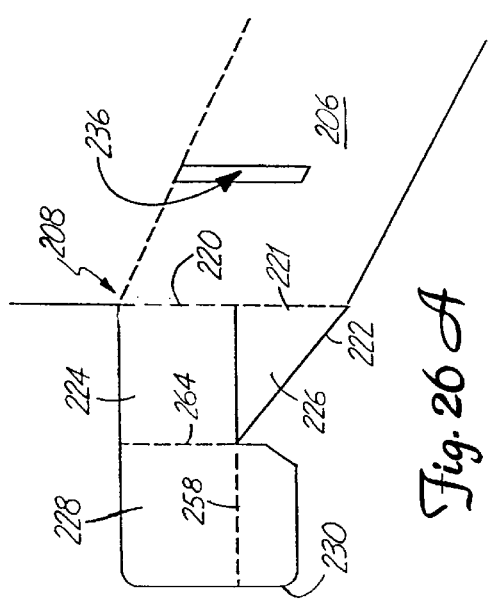
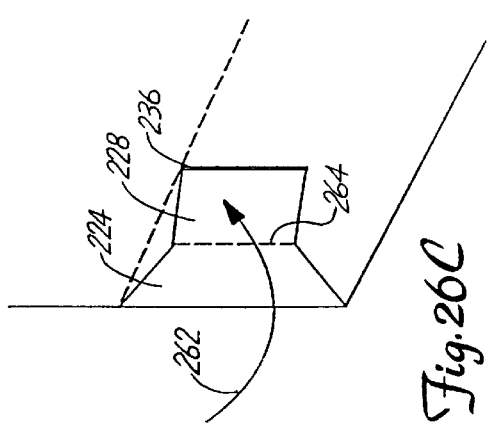

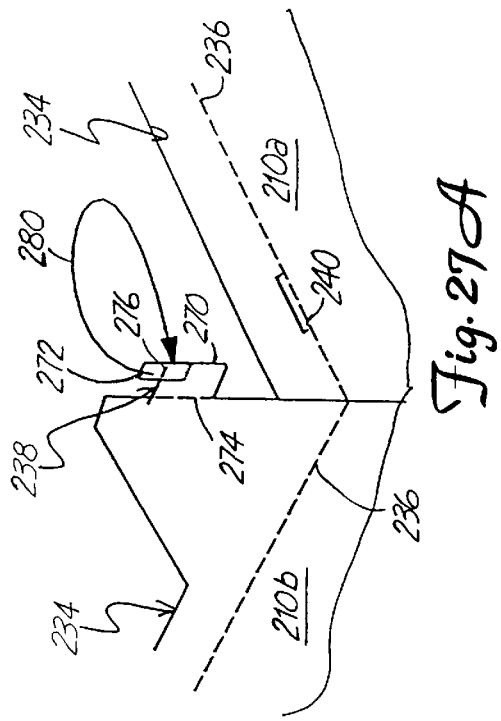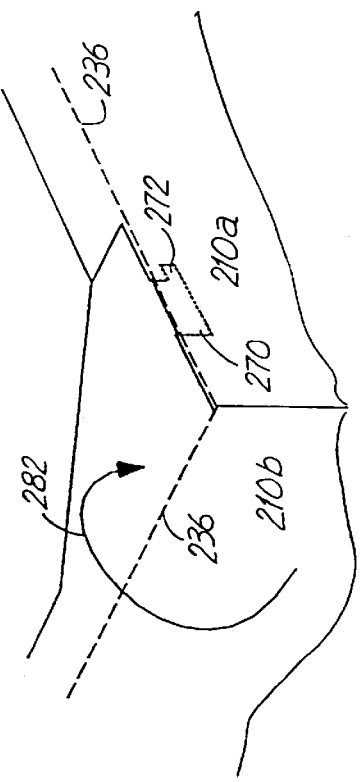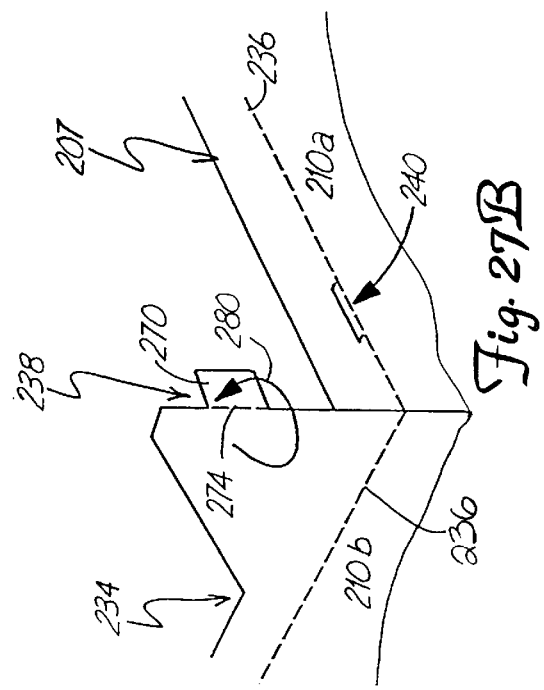
Fig. 27A
Fig. 27A
Fig. 27B

PET LITTER BOX

CROSS-REFERENCE TO RELATED APPLICATION

This application is a Continuation-In-Part of application Ser. No. 08/606,925, filed on Feb. 26, 1996 U.S. Pat. No. 5,785,001, entitled PET LITTER BOX HAVING EXTENDABLE SIDES.

BACKGROUND OF THE INVENTION

The present invention relates to a pet litter box. More specifically, the present invention relates to a disposable pet litter box which may be used for pet litter refuse and then disposed.

Some domestic animals, such as cats, are trained to target waste in a confined area. Cat litter boxes are commonly used which are filled with a granular, clay or clay-based material to absorb waste and odors associated with animal waste. The granular nature of the material allows the animals to move the material with their paws to cover and bury their waste. After repeated use, the litter material in the litter box becomes saturated with waste and needs to be emptied and refilled for continued use.

Some cat litter boxes are formed of a durable material that can be reused over and over for a long period of time. Thus, prior to using the reusable litter box, it is necessary to thoroughly clean the litter box and sanitize the litter box prior to refilling the litter box with litter material. This can be an undesirable task.

Disposable litter boxes may be constructed for containing litter material to provide a facility for a domestic animal to deposit waste. A disposable litter box is filled with litter material as in a reusable litter box. After animal waste has saturated the litter material in the litter box, the litter box and the litter material may be sealed and disposed of without mess. Thus, the pet owner does not need to scrub the litter box or handle the litter material or animal waste directly as in a reusable litter box. Removing litter material from the litter box can be a messy, unpleasant, unsanitary, and potentially unhealthy task. The pet owner must typically lift the heavy litter tray (containing litter soiled with animal waste) and pour the contents of the tray into a trash container, such as a plastic trash bag. Even when great care is exercised by the pet owner, there is a substantial risk of accidentally spilling the soiled litter or accidentally tearing the trash bag, causing the soiled litter material to spill. Further, the process of emptying the litter box disturbs the litter, resulting in unpleasant odors, dust, and airborne pollutants. Litter material soiled with animal waste can pose a health risk to people.

Since animal waste is in liquid form, it is necessary that the disposable litter box be constructed and designed to contain moisture or liquids within the disposable litter box. Typically, a pet owner will use a litter box for about a week prior to emptying the litter box or disposing the litter box. Thus, it is desirable that a disposable litter box be collapsible to a relatively small size for allowing a pet owner to easily store multiple replacement litter boxes for use. It is also desirable that a litter box be designed for ease of entry and use for the pet while still restricting litter from being scattered or spilled out of the litter box.

SUMMARY OF THE INVENTION

The present invention relates to a litter container formed of container walls hingedly coupled to a base and foldable between a collapsed position and an upright position to form an inner cavity of the container. A cover is hingedly coupled to an extended edge of a container wall for selectively closing the inner cavity of the container for disposal of litter material contained therein. The cover includes a series of spaced foldable extents to define an adjustable height threshold for entry to the inner cavity of the container.

In a preferred embodiment, the litter container includes barriers hingedly coupled to container walls to operate between a folded closed position and an extended upright position. In the upright position, the barriers limiting the spillage of litter material from the inner cavity of the container. Preferably, the barriers and cover are folded relative to container walls to close the opening of the inner cavity of the container. Barriers, container walls, and cover are preferably collapsible along foldable extents between the container walls and base to collapse the litter container to a generally flat structure for storage and transport. The litter container is designed to provide a continuous connecting structure between adjacent container walls for enhancing the moisture retaining qualities of the litter box.

BRIEF DESCRIPTION OF THE DRAWINGS

FIGS. 2–7A illustrate opening of the pet litter containment system shown in FIGS. 1A–1C.

FIGS. 8–11 show the closing of the litter containment system shown in FIGS. 1A–1C.

FIG. 12 shows one embodiment of a sealing arrangement for resealing the litter containment system.

FIG. 13 shows a second embodiment of a sealing arrangement for resealing the litter containment system.

FIG. 14 shows a third embodiment of a sealing arrangement for resealing the litter containment system.

FIGS. 18A–18C illustrate connection members for connecting adjacent barriers of the litter box.

FIGS. 24A–C are illustrative views illustrating collapse of the litter box of FIG. 23 for storage or transport.

FIGS. 26A–D are illustrative views showing operation of tabs for connecting adjacent container walls of FIG. 23.

FIGS. 27A–C illustrate connection of adjacent barriers along rims by connection members of the embodiment of FIG. 23.

DETAILED DESCRIPTION OF THE PREFERRED EMBODIMENTS

Figure 1:
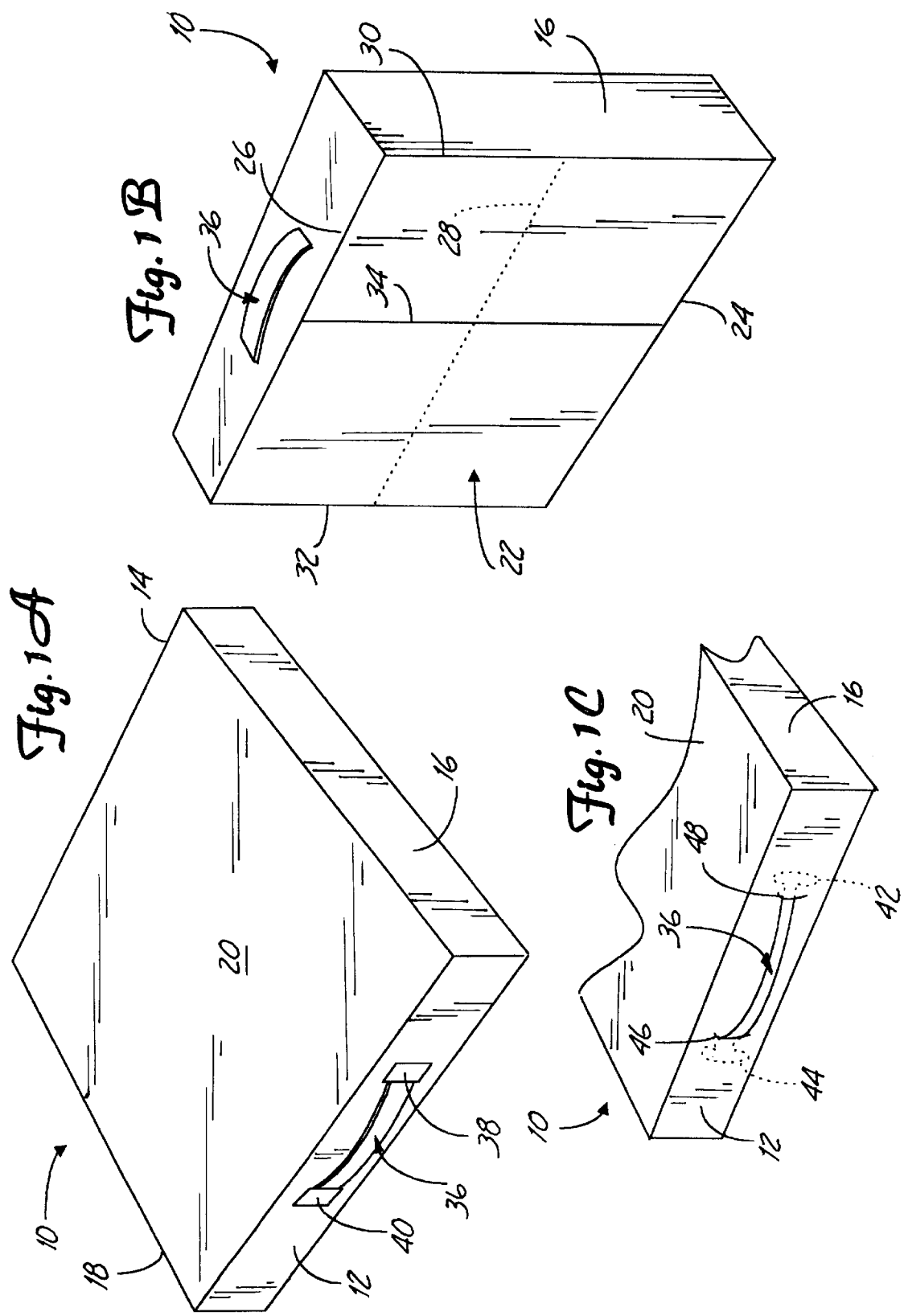
FIGS. 1A, 1B and 1C are front and side elevational views, respectively, of a pet litter containment system according to the present invention.

FIGS. 1A, 1B and 1C are perspective views of pet litter containment system or box 10 according to the present invention. Pet litter containment system 10 includes first and second generally opposed side panels 12 and 14, and third and fourth generally opposed side panels 16 and 18. Pet litter containment system 10 also includes a top closure 20 and a bottom closure 22. The components of system 10 are preferably formed of a sturdy material, such as corrugated cardboard or plastic. In the embodiment in which system 10 is formed of corrugated cardboard, it is preferably lined with a moisture-resistant material such that any urine, or fecal material which contains moisture, is contained within the box. This also helps prevent deterioration of the box material during use.

Generally opposed sides 12 and 14 and generally opposed sides 16 and 18 are fastened together in a conventional method, such as being formed of an integral material which is bent or folded, or such as by appropriately applied adhesive to adjoining sections.

Bottom closure 22 preferably includes a plurality of flaps of the box material which are foldable into the closed position shown in FIGS. 1A and 1B. The flaps can be arranged in any suitable, known orientation, such as a pair of flaps which fold along hinge sections 24 and 26 to become aligned generally along seam 28, shown in phantom in FIG. 1B, and two other flap portions which fold along hinge areas 30 and 32 to generally abut one another along seam 34. The flap portions are typically held against one another by adhesive, or adhesive tape, or any similar closure system.

Alternatively, closure 22 could include two or more flaps each of which has an outer peripheral dimension which is the same as the total area of closure 22. These flaps are folded over one another to close the bottom of containment system 10.

Panel section 12 also preferably has a handle 36 disposed thereon. Handle 36 can be any suitable handle, such as a plastic or other polymer material attached to panel section 12. In one embodiment, handle 36 simply has two connective tabs 38 and 40 which are connected by adhesive to panel section 12. In another embodiment, shown in FIG. 1C, handle 36 has a plurality of enlarged end portions 42 and 44 which are inserted through slots 46 and 48 in panel section 12. In either case, handle 36 is arranged to be suitable to support the weight of system 10 when it is fully loaded with pet litter.

Figure 2:
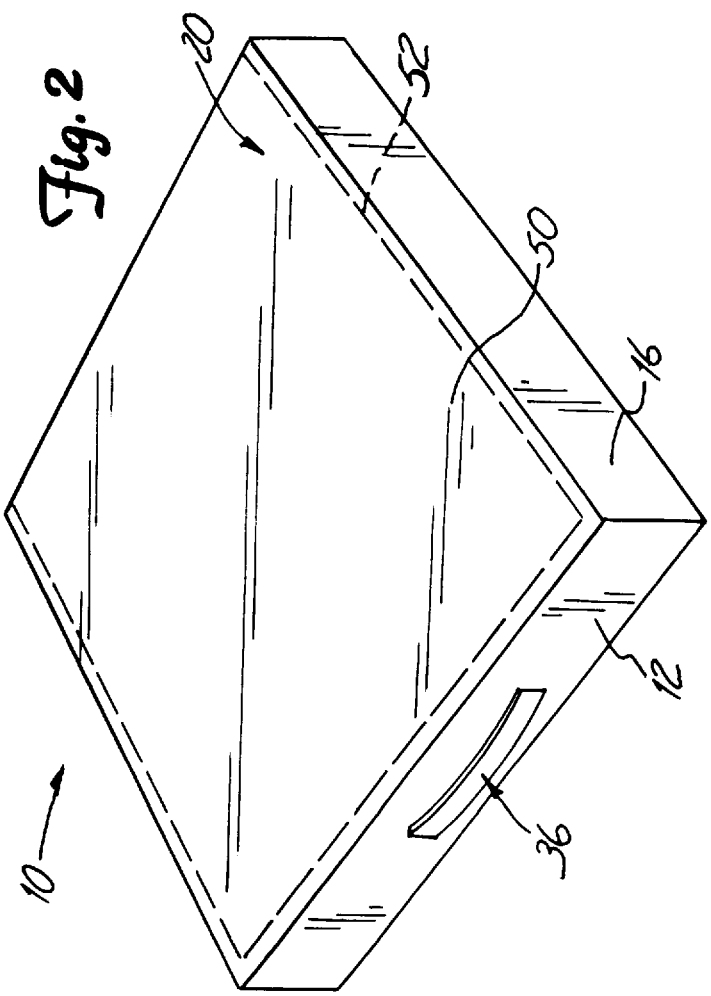

The arrangement of top closure 20 is set out in more detail in FIGS. 2–12. FIG. 2 shows that top closure 20 has at least a first panel 50 which is sealed to the remainder of containment system 10 by a removable seal 52, shown in phantom in FIG. 2. Removable seal 52 can be any commercially available, and generally known removable seal mechanism, such as removable adhesive tape, or pull strings which, when pulled, disengage three of the four sides of top panel 50 from the remainder of closure system 10. This disengagement is the first step in opening containment system 10.

Figure 3:
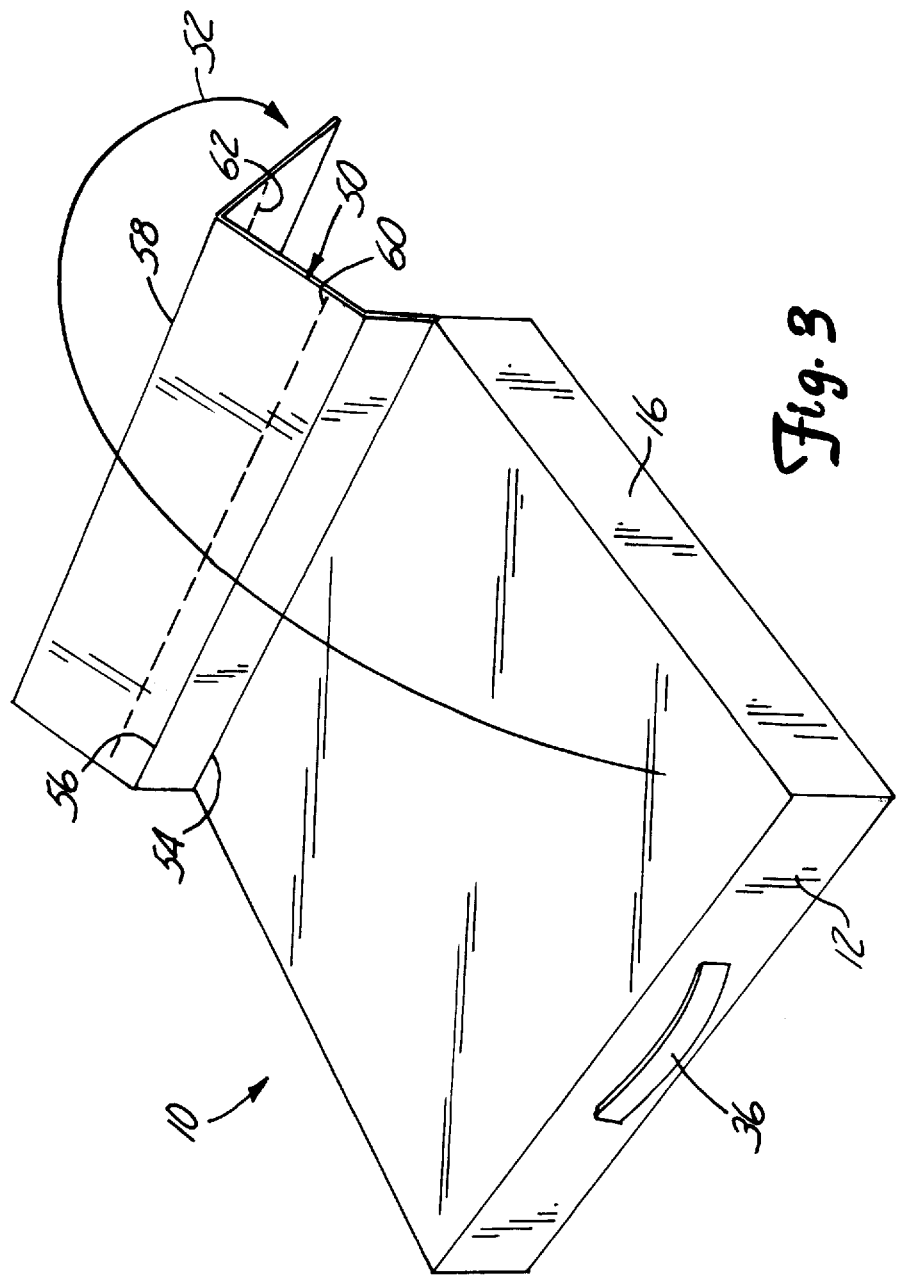

FIG. 3 illustrates a second step in opening containment system 10. Once the three sides of panel 50 are disengaged from the remainder of panel system 10, panel 50 is pulled back in a direction illustrated by arrow 52. Panel 50 is provided with pre-scored, or pre-depressed fold lines 54, 56 and 58. The fold lines act as hinges such that sections of panel 50 can pivot or fold relative to one another. In one preferred embodiment, panel section 50 is also provided with a second set of pre-scored or pre-depressed fold lines 60 and 62. This second set of fold lines can be used in folding open panel section 50, and this will be described in greater detail later in the specification.

FIG. 4 shows the next step in opening containment system 10. Panel section 50 is folded about fold lines 56 and 58 such that a distal portion of panel section 50 is folded beneath the remainder of containment system 10. FIG. 4 illustrates that hinge 54 is separated from hinge 56. Therefore, when panel section 50 is folded as shown in FIG. 4, a portion of the panel section extends upwardly from hinge 54, away from the remainder of containment system 10 to form an upwardly extending ridge or barrier.

FIG. 4A shows panel section 50 folded in a similar manner. However, rather than being folded along fold lines or hinges 56 and 58, panel section 50 is folded along fold lines 60 and 62. Thus, the ridge or barrier section formed by the portion of panel section 50 between fold lines 54 and 60 is taller than that between fold lines 54 and 56. FIG. 4 also shows that another panel section 64 is exposed once panel section 50 is folded back and under the remainder of containment system 10.

FIG. 5 illustrates the next step in opening containment system 10. FIG. 5 illustrates that panel section 64 is folded in a direction indicated by arrow 66. This step is similar to the step illustrated by FIG. 4 in that panel section 64 preferably has a plurality of fold lines to make the barrier or ridge section extending away from containment system 10 that has a height which is selectable. For the sake of clarity, the fold lines in panel section 50 are numbered the same as those in panel section 64. Thus, after the step shown in FIG. 5, containment system 10 has a pair of oppositely disposed ridges or barrier sections 66 and 68. FIG. 5 also illustrates that once panel sections 50 and 64 are removed, a third panel section 70 is exposed.

FIG. 6 indicates the next step in opening containment system 10 shown in FIGS. 4 and 5, respectively. The difference is that panel section 70 is folded in a direction indicated by arrow 72. As with panel sections 50 and 64, panel section 70 preferably has a plurality of sets of fold lines (which are similarly numbered to those in panel sections 50 and 64). Once the step illustrated by FIG. 6 is performed, containment system 10 has three ridge sections or barrier sections 66, 68 and 74 which extend up and away from the remainder of containment system 10. FIG. 6 also illustrates that a fourth top panel section 76 is exposed once the three previous panel sections 50, 64 and 70 have been folded away.

FIG. 7 illustrates the next step in opening containment system 10. In the step shown in FIG. 7, panel section 76 is folded back in a similar fashion to panel sections 50, 64 and 70, except that it is folded in a direction indicated by arrow 78. As with the other top panel sections, panel section 76 also preferably has a plurality of sets of fold lines so that the height of the barrier segment 80 formed by panel section 76 is selectable or variable.

FIG. 7 illustrates that, once as four barrier segments 66, 68, 74 and 80 which abut one another to form a substantially continuous upwardly extending ridge or barrier. This barrier is highly useful in preventing litter contained in containment system 10 from being scattered by the pawing of the pet using containment system 10.

FIG. 7 also shows that containment system 10 is provided with pet litter 82. In the preferred embodiment, pet litter 82 is placed within containment system 10 prior to it being sold. However, containment system 10 can also be manufactured and sold separately, and the pet litter 82 can be placed in containment system 10 after it is opened. In either case, the pet litter 82 is contained within containment system 10 and the upwardly extending ridge portions extend up and around embodiment of containment system 10 according to the present invention. FIG. 7A shows the barrier segments 66, 68, 74 and 80. However, rather than forming one substantially upwardly extending ridge or barrier, barrier segment 80 is folded into the arrangement in which it has a lower profile than the other barrier segments. Thus, containment system 10 has three sides which have higher profile barriers, and one side which has a lower profile barrier. This arrangement provides a great deal of protection against litter scatter on the three sides which have the high profile barriers. This arrangement also allows ease of pet entry on the side having the lower profile barrier segment.

FIGS. 8–11 illustrate the process used in closing containment system 10. FIG. 8 illustrates that the first step in closing containment system 10 is to fold panel 76 back in a direction indicated by arrow 84 which is generally opposite the direction indicated by arrow 78 shown in FIG. 7. Once flap 76 is folded in this manner, flap 70 is returned to its closed position. This is indicated in FIG. 9. Flap 70 is folded back in a direction indicated by arrow 86. This direction is generally opposite the direction indicated by arrow 72 in FIG. 6. FIG. 10 illustrates that panel section 64 is then folded back in the direction indicated by arrow 88, generally opposite the direction indicated by arrow 67 in FIG. 5. It will be noted that this step exposes or reveals handle 36.

FIG. 11 shows the next step performed in closing containment system 10. In this step, panel 50 is folded back in a direction indicated by arrow 90. This is generally opposite the direction indicated by arrow 52 in FIG. 4. This substantially completes the closing sequence used in closing containment system 10. It should be noted that, once this step is complete, containment system 10 is substantially back in the same position it was in prior to being opened.

The next preferred step in using system 10 is to reseal system 10 so that the pet litter cannot escape from the system. FIG. 12 illustrates one embodiment used in resealing containment system 10. FIG. 12 illustrates that the underside of panel section 50 is provided with an adhesive 92 which has a peel-off adhesive backing material 94. Adhesive 92 and backing 94 are preferably disposed on the entire lower surface of panel section 50, but may be disposed only around its periphery, or about another suitable portion for resealing containment system 10. The adhesive material can be any suitable form of commercially available adhesive.

FIG. 13 shows a second embodiment used in resealing containment system 10. In this embodiment, adhesive strips are provided either with, or within, containment system 10 during manufacture of containment system 10. Then, once the user desires to reseal containment system 10, the adhesive strips 96 (which are preferably provided with a peel-off backing) are used and placed about containment system 10 as shown in FIG. 13, or in any other suitable arrangement.

FIG. 14 simply illustrates another arrangement in which adhesive strips or tape portions are used in sealing containment system 10.

Therefore, the present invention provides a fully self-contained pet litter system which substantially eliminates problems associated with prior bag-type litter systems. Litter can either be placed in containment system 10 once it is opened, or it can be placed in containment system 10 during manufacture of containment system 10. In either case, the used or soiled litter is never removed from containment system 10. Containment system 10 is simply resealed and the entire containment system is discarded. Also, containment system 10 has pre-scored fold lines or other hinge-type arrangements in the top closure such that an upwardly extending barrier or ridge is formed about the pet litter within containment system 10. This significantly reduces the likelihood that any of the pet litter will be expelled from containment system 10 during use. In one embodiment, a plurality of sets of hinges are provided to facilitate forming a barrier having a selectable height. This provides an adaptable system which can be configured with high profile barrier segments, low profile barrier segments or a combination thereof for ease of pet entry. Further, containment system 10 is a box which is substantially rigid as compared with prior bags which contain litter. This is significantly easier to store and makes for a much neater and cleaner appearance than stacked bags in the merchandiser's facility. Also, the flat surface of containment system 10 provide a greater area upon which to display advertisements or marketing material. Containment system 10 includes a handle 36 which makes containment system 10 very easy to transport both while purchasing containment system 10, and while discarding containment system 10. Thus, containment system 10 is substantially improved over prior pet litter systems.

Figure 15:
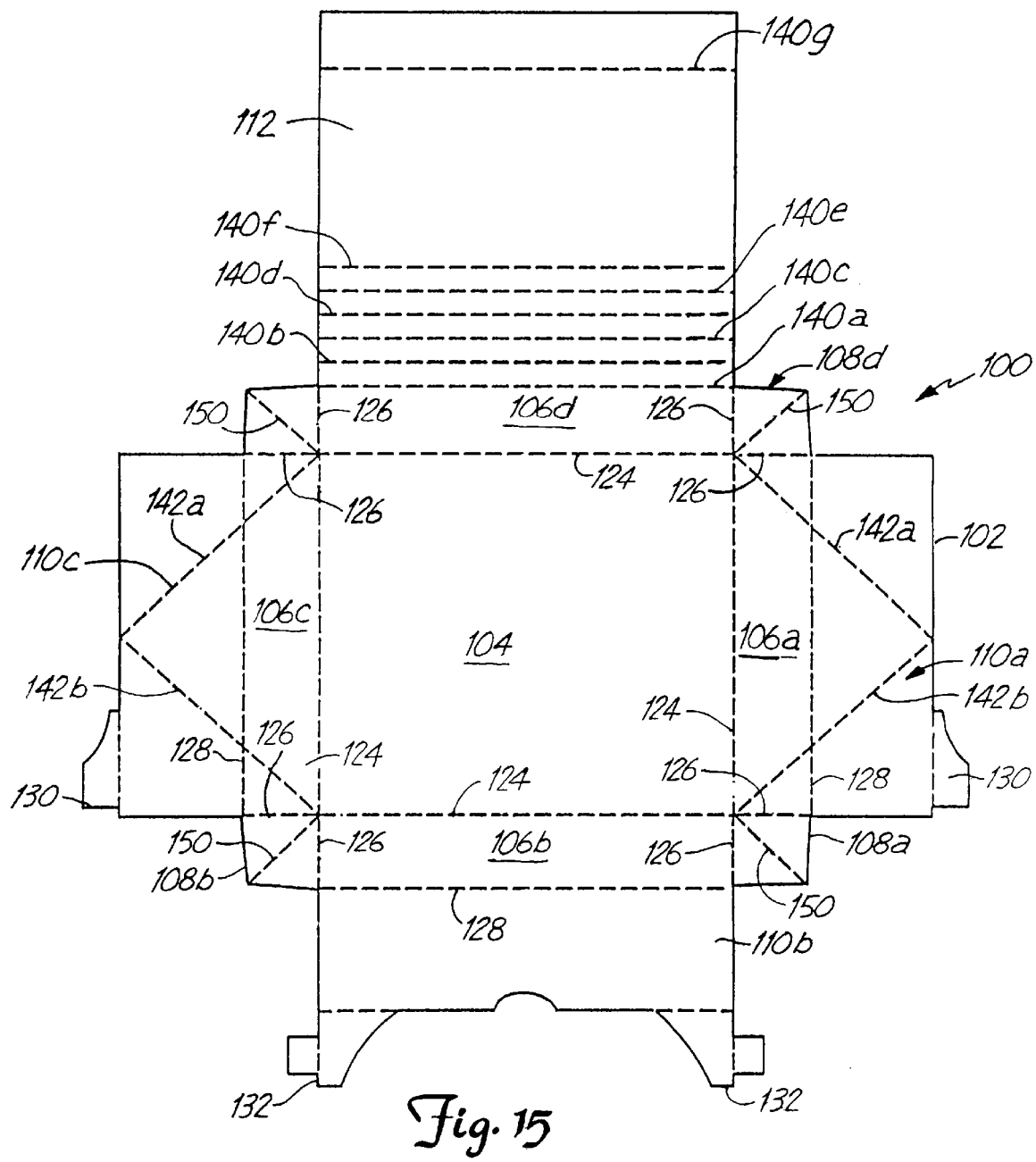
FIG. 15 is a plan view of an unassembled alternate embodiment of a litter box of the present invention.

FIGS. 15–22 illustrate an alternate embodiment of a litter box of the present invention. FIG. 15 is a plan view of an unassembled litter box 100. As shown, the litter box is formed of a unitary sheet 102, which is assembled to form the litter box 100. As shown, the unitary sheet 102 is designed to form a container base 104, container walls 106a–d, tabs 108a–d, barriers 110a–c, and cover 112. Preferably, tabs 108a–d have sides which are integrally formed and hingedly coupled to side edges of the container walls 106a–d along foldable extents 126. As shown, the container base 104 is preferably formed of a rectangular-shaped construction. Container walls 106a–d extends from the sides of the outer perimeter of the container base 104 and are hingedly coupled to the container base via foldable extents 124. Tabs 108a–d are arranged between perpendicularly arranged container wall 106a–d.

Barriers 110a–c, respectively, extend from an upper edge of container walls 106 and are hingedly coupled to container walls 106 via foldable extents 128. Preferably, as shown, three container walls 106a–106c include barriers 110a–c extending therefrom. Although three barriers are shown, it should be understood that the invention is not limited to three barriers and that any number of barriers may be used. As will be described, the barriers 110a–c include connection members 130 and 132 for detachably connecting adjacent barriers.

Cover 112 extends from an upper surface of container wall 106d and is hingedly coupled to container wall 106d. Cover 112 includes a plurality of foldable extents 140a–g for providing an adjustable height passageway for entry and exit to the litter container as will be described. Container wall 106a and barrier 110a, and container wall 106c and barrier 110c, include diagonal hinges defined by foldable extents 142a–b extending between foldable extent 124 and an extended upper edge of barriers 110a, 110c for collapsing the assembled litter box 100 as will be explained.

Preferably, the unitary sheet 102 is formed of a corrugated cardboard material having an inner corrugated core and outer layers (not shown). The corrugated cardboard material is preferably treated with a moisture resistant material or coating as is known for retaining moisture within the container. Foldable extents of the container are formed of weakened extents in the corrugated cardboard material to allow portions of the litter box 100 to fold relative to one another. In particular, the cardboard material may be weakened along an extent by compressing the corrugated core between inner and outer layers of the cardboard material or forming perforations along an extent of the cardboard material. Alternatively, the litter box 100 may be formed of other materials, such as a plastic material, and alternate hinge arrangements may be used.

Figure 16:
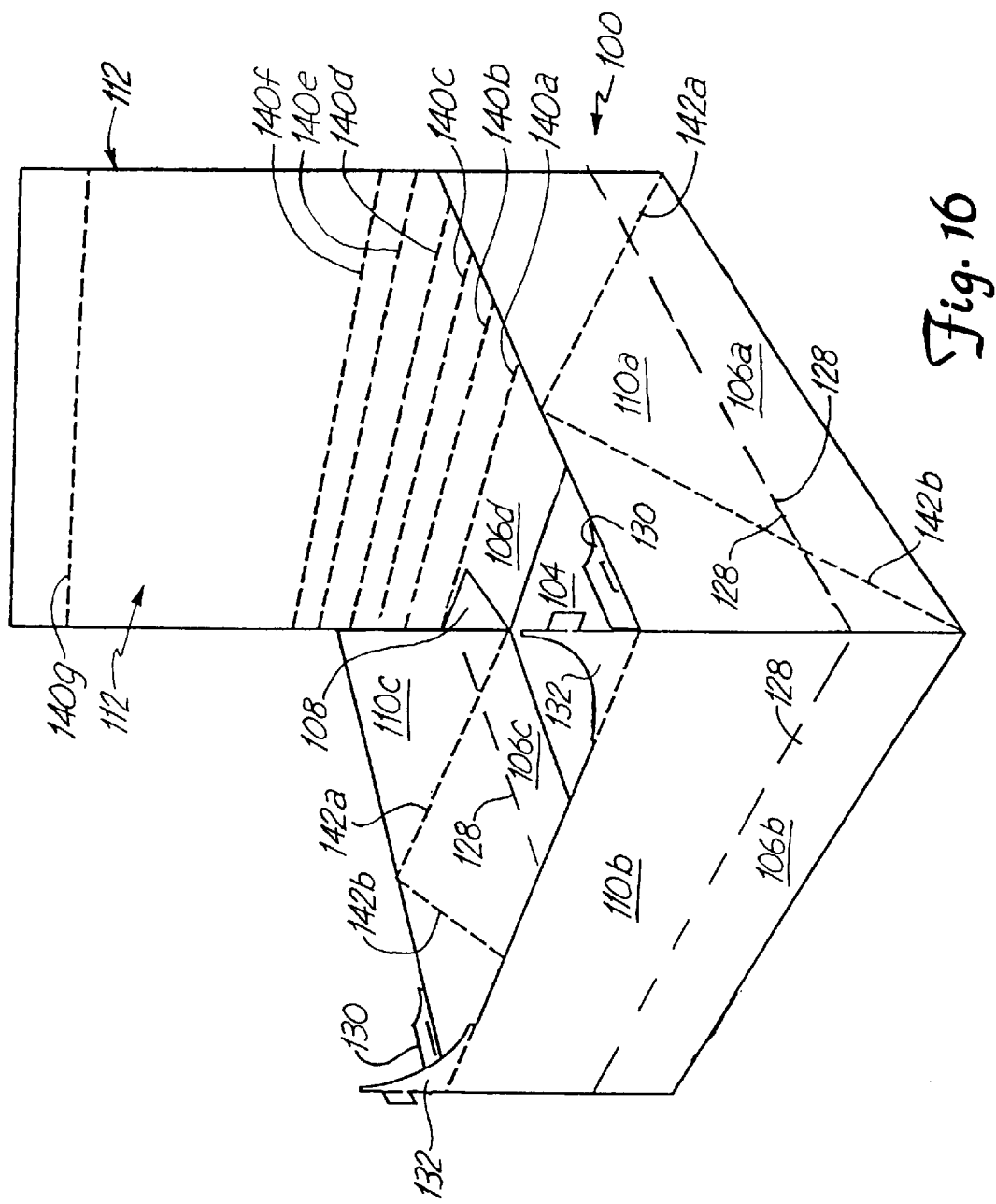
FIG. 16 is a perspective view of a partially assembled litter box of FIG. 15, shown without adjacent barriers connected.

FIG. 16 illustrates an assembled litter box 100 of the present invention. As shown in FIG. 16, to assemble the litter box shown in FIG. 15, container walls 106a–106c are folded generally perpendicularly relative to base 104 and container walls 106a, 106b; and 106b, 106c; 106c, 106d and 106d, 106a are secured relative to tabs 108a–d, respectively, as will be explained. Thus, as described, base 104 and container wall 106a–106d form a container portion having an inner cavity and an opening thereto into which litter material may be deposited for use by a pet.

For use of the litter box 100, barriers 110a–110b and 110b–110c may be positioned in the upright position and detachably coupled in perpendicular relation via connection tabs 130, 132. Barriers 110a–110c provide extensions to container wall 106a–106c to maintain litter material within the inner cavity of the container so that it does not spill out of the container. Container wall 106d does not include a barrier and defines an passageway for a pet to enter and exit the container portion of the litter box 100, as will be explained.

Figure 17A:
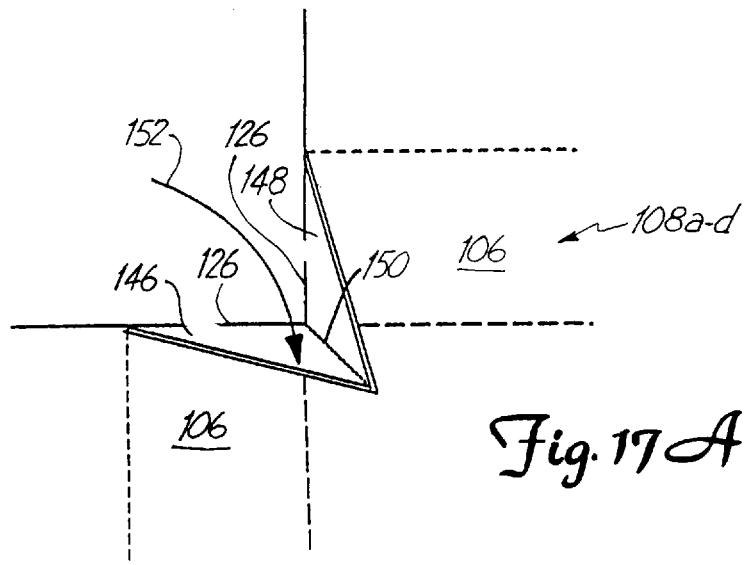
FIGS. 17A–17B are illustrative views showing operation of tabs for connecting adjacent container walls.
Figure 17B:
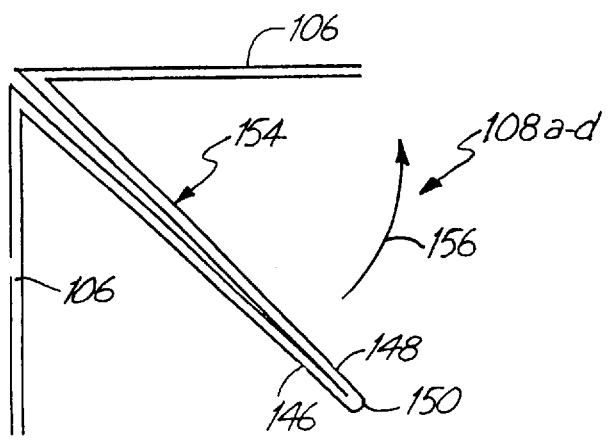

FIGS. 17A–17B illustrate the connection of container walls 106a–106d via tabs 108a–108d. As shown in FIGS. 17A–17B, tabs 108a–108d include tab portions 146, 148 coupled to adjacent container walls at foldable extent 126. Tab portions 146, 148 are hingely coupled by diagonal foldable extent 150. Thus, as illustrated in FIG. 17A, to assemble the litter box 100, the container walls are folded in an upright direction to align container walls perpendicular to base 104. Tab portions 146, 140 are folded inwardly, as illustrated by arrow 152, along the extent 150 to force container walls 106 upright, essentially perpendicular to base 104. As container walls are raised to the upright position, tab portions 146,148 fold together to mate in face to face relation to form a folded tab 154 as shown in FIG. 17B. The folded tab 150 is then rotated as indicated by arrow 156 to position the folded tab 154 relative to a container wall so that the folded tab 154 can be secured relative to the container wall.

It should be understood that the folded tabs 154 may be connected to either adjacent container wall. Preferably, the folded tab 154 is secured to a container wall via a common adhesive or via staples. Alternatively, the folded tab 154 may be removable coupled to the container wall. Since tab 108 is integrally formed with exposed sides of adjacent container walls and formed of a continuous structure (i.e., tab portions 146, 148 are integrally formed), tabs 108 and adjacent container walls 106 form a continuous structure without gaps through which fluid may leak.

FIGS. 18A–18C illustrate connection members 130 and 132 which connect adjacent to barriers 110a–110c. As shown in FIGS. 18A–18C, connection member 132 includes a tab 158 and a flap 160. The tab 158 supports the flap 160 relative to a first barrier (barrier 110b, for example). The tab 158 is hingely coupled to an exposed upper edge of the barrier via a foldable extent 162, and flap 160 is foldably coupled to tab 158 via foldable extent 164. Connection member 130 includes a tab 166, including a slot 170 formed therein. Tab 166 is also hingely coupled to a barrier adjacent to connection member 130 along foldable extent 172.

As illustrated in FIG. 18B, flap 160 is folded along foldable extent 164 as illustrated by arrow 174. Tab 166 is folded along foldable extent 172 as illustrated by arrow 178 to align slot 170 relative to flap 160. Tab 158 is folded along foldable extent 162 as illustrated by arrow 179 in FIG. 18C, for inserting flap 160 into slot 170 for connecting adjacent barriers 110a–110b and 110b–110c. Thus, as described, flap 160 is concealed within slot 170 to provide a concealed connection design.

As illustrated in FIGS. 18A–18C, tab 158 has an exposed curved surface 180 designed to align with a curved surface 182 of tab 166 to provide a curved edge rim between adjacent barriers. The curved shape of the rim reduces the interference with the opening to the inner cavity of the assembled litter box. The tabs 158 and 166 increase the structural integrity of the connection between adjacent barriers 110. As shown, connection members 130 are located on opposed sides of barrier 110b for connection with members 132 on adjacent barriers 110a, 110c. It should be noted that connection members 130 and 132 may be arranged in any fashion on cooperating surfaces of adjacent barrier 110a, 110b, and 110b, 110c.

Figure 19:
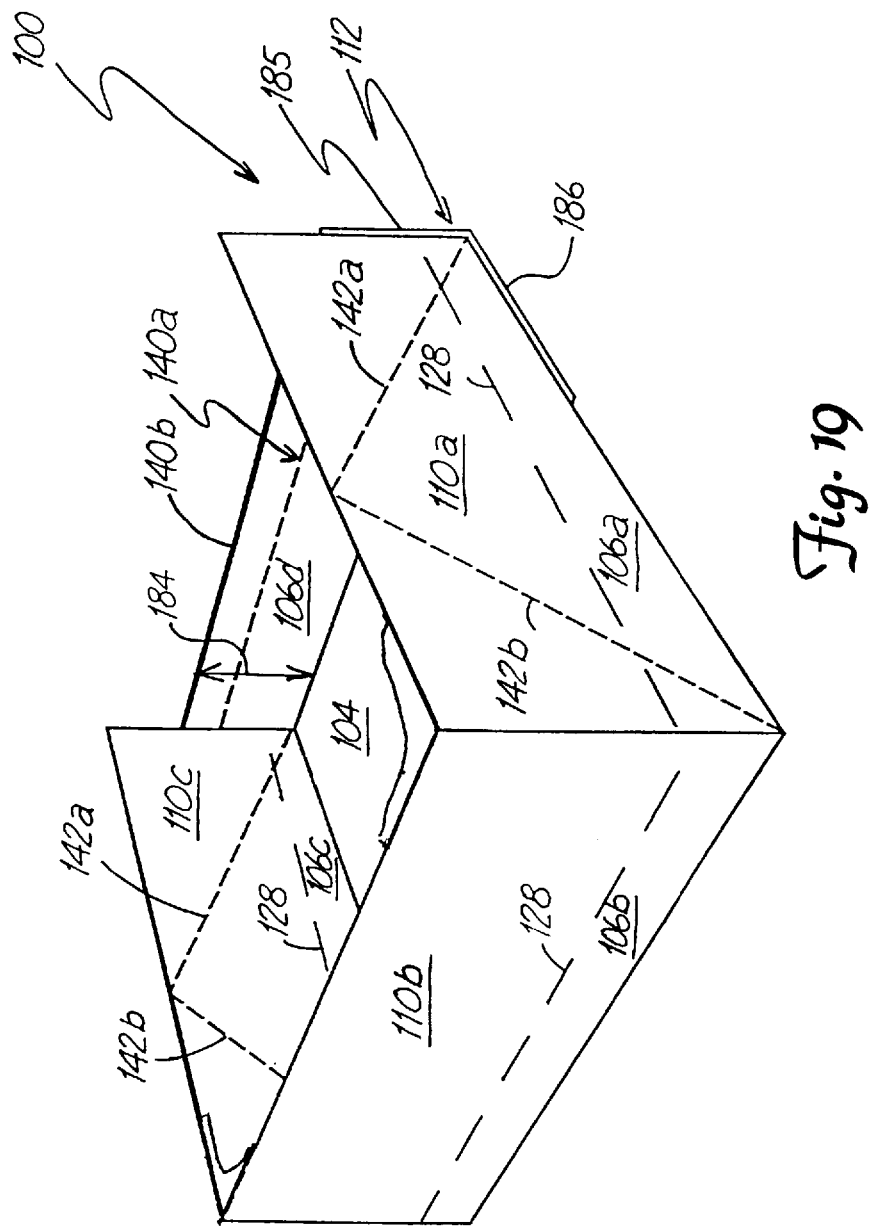
FIG. 19 is a perspective view illustrating a cover of the litter box folded to form an opening to the inner portion of the container.

FIG. 19 is a perspective view of the litter box 100 in an assembled upright position for use. As shown in FIG. 19, cover 112 is folded along a foldable extent to define an adjustable height threshold 184 and first and second folded portions 185, 186. The first folded portion 185 extends along the height of the adjustable threshold 184 and the second folded portion 186 folds under base 104 to extend in parallel alignment with base 104.

In particular, cover 112 is folded along various selectively spaced foldable extents 140a–g as illustrated in FIGS. 15–16. The foldable extents 140a–g are spaced so that the cover 112 is folded along a first extent to define the height of the threshold 184, and folded along a second extent to define the first and second folded portions 185, 186. For example, the cover is folded along extent 140a to define the height of the container wall and folded along extent 140c to fold cover 112 under base 104 out of the way for operation. Cover 112 may be folded along extent 140b and extent 140f for a higher threshold 184; and, for an even higher threshold, cover 112 may be folded along hinges 140f and 140g. It should be noted that the foldable extents may be arranged so that only a threshold and first folded portion is defined for storing the cover during use of the litter box.

Figure 20:
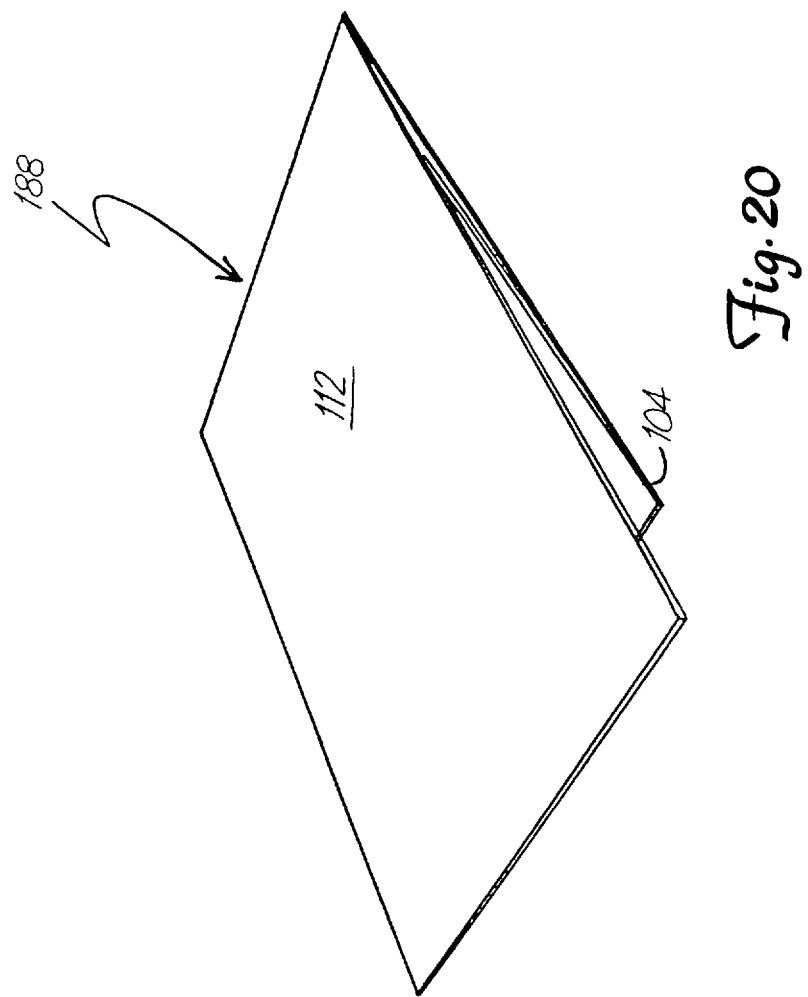
FIG. 20 is a perspective view illustrating the litter box in a collapsed position to form a generally flat structure.
Figure 21:
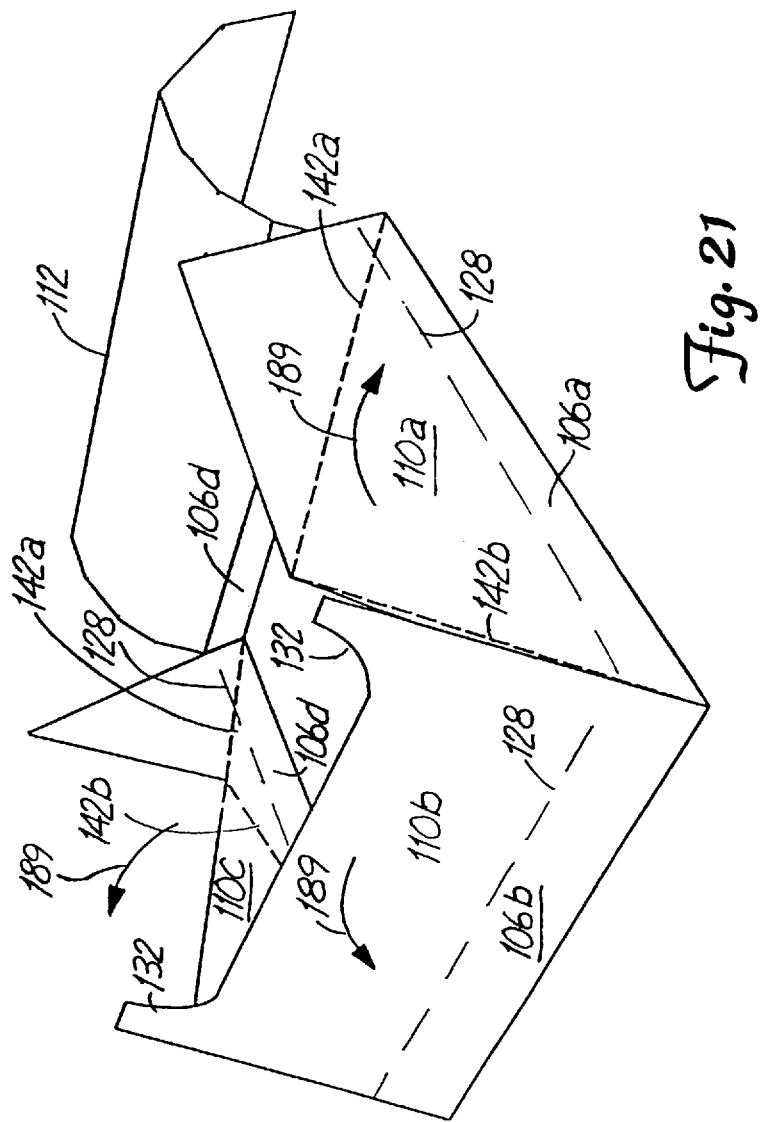
FIG. 21 is a perspective view illustrating the litter box being extended from the collapsed position to an upright position for use.

As shown in FIG. 20, the litter box 100 is collapsible via foldable extents 142a–b on container walls 106a,c and barriers 110 a,c into a flat structure 188 to define a collapsed box for storage and transport prior to use. The litter box 100 is collapsed when barrier tabs 130, 132 are disconnected. For use of the litter box 100, container walls and barriers are raised from the collapsed position shown in FIG. 20 along extents 142a, 142b to the upright position, as illustrated by arrows 189 in FIG. 21, to form the inner cavity which is filled with litter and is surrounded by scatter barriers so that the litter is contained within the litter box.

Figure 22:
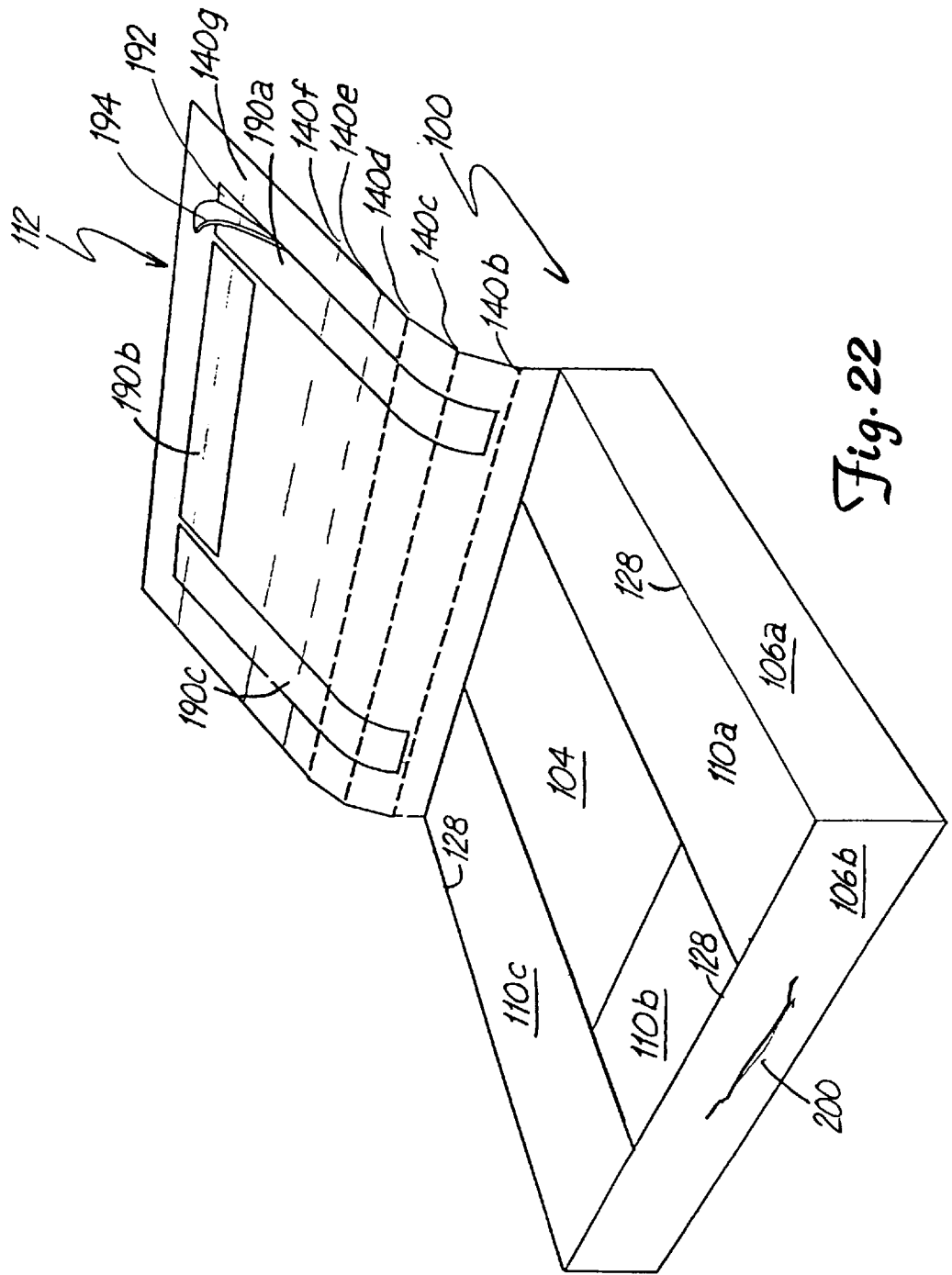
FIG. 22 is a perspective view illustrating barriers collapsed relative to container walls for sealing a container portion of the litter box.

After the litter box is fill or when the litter box will be disposed, the inner cavity of the container portion is sealed closed as illustrated in FIG. 22. In particular, barriers 110a–c are collapsed or folded along extents 128 to collapse the assembled litter box 100 from the upright position to the closed position. To collapse barriers 110a–c, connection members 130, 132 are detached to collapse barriers 110a–c about extents 128 in parallel alignment with base 104 to define a sealable container portion defined by base 104 and walls 106a–d. Thereafter, cover 112 is collapsed along foldable extent 104a between cover 112 and container wall 106d to provide a top to seal spoiled litter within the inner cavity of the container portion for discard. Thus, after use of the litter box 100, the container portion of the litter box 100 may sealed for disposal of soiled litter material. Additionally, the litter box 100 may be presold with litter in the container portion. Thus, the litter box 100 is not collapsed prior to use, but is in the closed position as illustrated in FIG. 22, and then cover is removed and barriers are moved to the upright position for use of the litter box.

The cover 112 may be sealed relative to barrier to portions 110a–c via adhesive strips 190a–c. Preferably, the adhesive strips include dual sided layers of adhesive 192. A first layer of adhesive 192 is secured to cover 112 and a second layer is covered by a protective sheet 194. The protective sheet 194 is removed from adhesive strips 190a–c to the seal cover 112 to closed barriers. Any number of methods may be used to seal cover 112, for example, an entire contact surface of cover 112 may include an adhesive layer which is covered by a protective layer (not shown). Alternative connection members may be used, as illustrated and described with respect to other embodiments. After the container portion is sealed, the litter box 100 and soiled contents sealed therein may be easily disposed without significant contact with the soiled litter material. As shown in FIG. 22, a handle 200 may be included on container walls 106a–b for facilitating transport of the sealed container portion.

Figure 23:
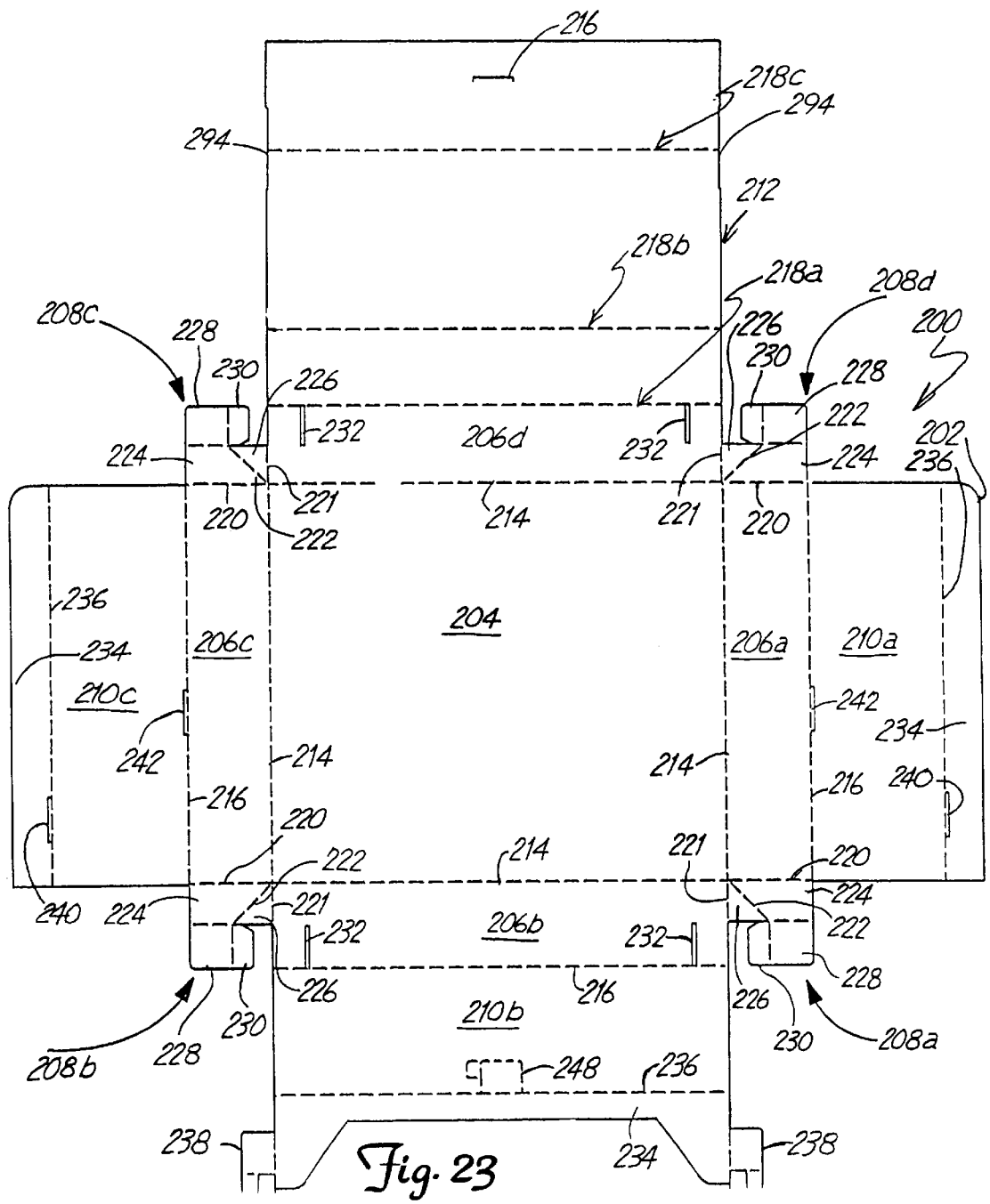
FIG. 23 is a plan view of an unassembled embodiment of a litter box of the present invention.

FIGS. 23–31 illustrate another embodiment of litter box 200. FIG. 23 is a plan view of an unassembled litter box 200. As shown, the litter box is formed of a unitary sheet 202 which may be selectively assembled and unassembled for use, storage or transport. As shown, the unitary sheet 202 is designed to form a container base 204, container walls 206a–d, tabs 208a–d, barriers 210a–c, and cover 212. As shown, container base 204 is preferably formed of a rectangular-shaped construction. Container walls 206a–d extend from the sides of the outer perimeter of the container base 204 and are hingedly coupled to the container base along foldable extents 214. Barriers 210a–c extend from an upper edge of container walls 206a–c and are hingedly coupled to container walls 206a–c along foldable extents 216. Cover 212 is hingedly coupled to container wall 206d and includes foldable extents 218a–c. Any number of foldable extents can be used, allowing for many threshold heights.

As shown, tabs 208a–d are coupled between adjacent container walls 206a, 206b; 206b, 206c; 206c, 206d; and 206d, 206a. Tabs 208a–d are integrally formed and hingedly coupled to adjacent container walls at perpendicularly aligned sides of the tab along foldable extents 220, 221. In particular, the length of a first side of tab 208 extends along the length of a container wall and is coupled to container wall along foldable extent 220 and a second side of tab 208 preferably extends along foldable extent 221. Tab 208 includes a diagonal hinge defined by foldable extent 222 to define first and second tab portions 224, 226. To assembly adjacent container walls 206, tabs 208 are folded along extent 222 to raise adjacent container walls 206 to the upright position, as will be explained.

Tabs 208 also include insertion flap 228 and locking member 230. Container walls 206b, 206d include slots 232 aligned on opposed sides of walls 206b, 206d with insertion flaps 228 of tabs 208 when container walls are raised to the upright position as will be described. Barrier 210a–210c includes cooperating connection members for detachable securing barriers 210a–210c in an upright, assembled position. Preferably barriers include rims 234 foldable along foldable extent 236.

As shown in FIG. 23, rim 234 of barrier 210b includes connection members 238 formed on opposed sides of barrier 210b, which cooperate with transverse slots 240 on rims 234 and slots 242 of adjacent barrier 210a–210c for insertion of connection members 238 to selectively secure the litter box in an upright usable position and to secure the inner cavity of the container portion in a closed condition, as will be described.

Cover 212 includes spaced foldable extents 218a–c for providing an adjustable height passageway. Cover 212 also includes a slot 246 through which a connection member 248 formed on barrier 210b extends to secure the cover 212 in a closed position covering an opening to an inner cavity of the container portion as will be explained.

Preferably, the unitary sheet 202 is formed of a corrugated cardboard material having an inner corrugated core and outer layers (not shown). The corrugated cardboard material is preferably treated with a moisture-resistant material. Hinges or foldable extents of the container are formed of weakened extents in the corrugated cardboard material. In particular, the cardboard material may be weakened along an extent by compressing the corrugated core between the inner and outer layers of the cardboard material or forming perforations along the extent of the cardboard material. Alternatively, it should be understood that the litter box may be formed of alternative materials and construction is not limited to cardboard.

As shown in FIGS. 24A–24C, the litter box 200, formed of unitary sheet 202, can be folded to a collapsed, essentially flat structure 250, as shown in FIG. 24C for storage and transport. In particular, as shown in FIGS. 24A–24C, container walls 206 and barriers 210 form sides A and C of the container. Container wall 206d and cover 212 form side D of the container. As shown in FIGS. 24A–24C, sides A and C (wall 206a, barrier 210a and wall 206c, barrier 210c) are folded along foldable extent 214 between base 204 and container walls 206a–206c. In particular, as illustrated in FIG. 24A, sides A and C are folded in parallel alignment with base 204, as illustrated by arrows 252. Thereafter, side B is folded in parallel alignment with base 204 and sides A–C, as illustrated by arrows 254 in FIG. 24B. Next, side D is folded in parallel alignment with base 204 and sides A–C, as illustrated by arrows 256 in FIG. 24B.

Figure 25:
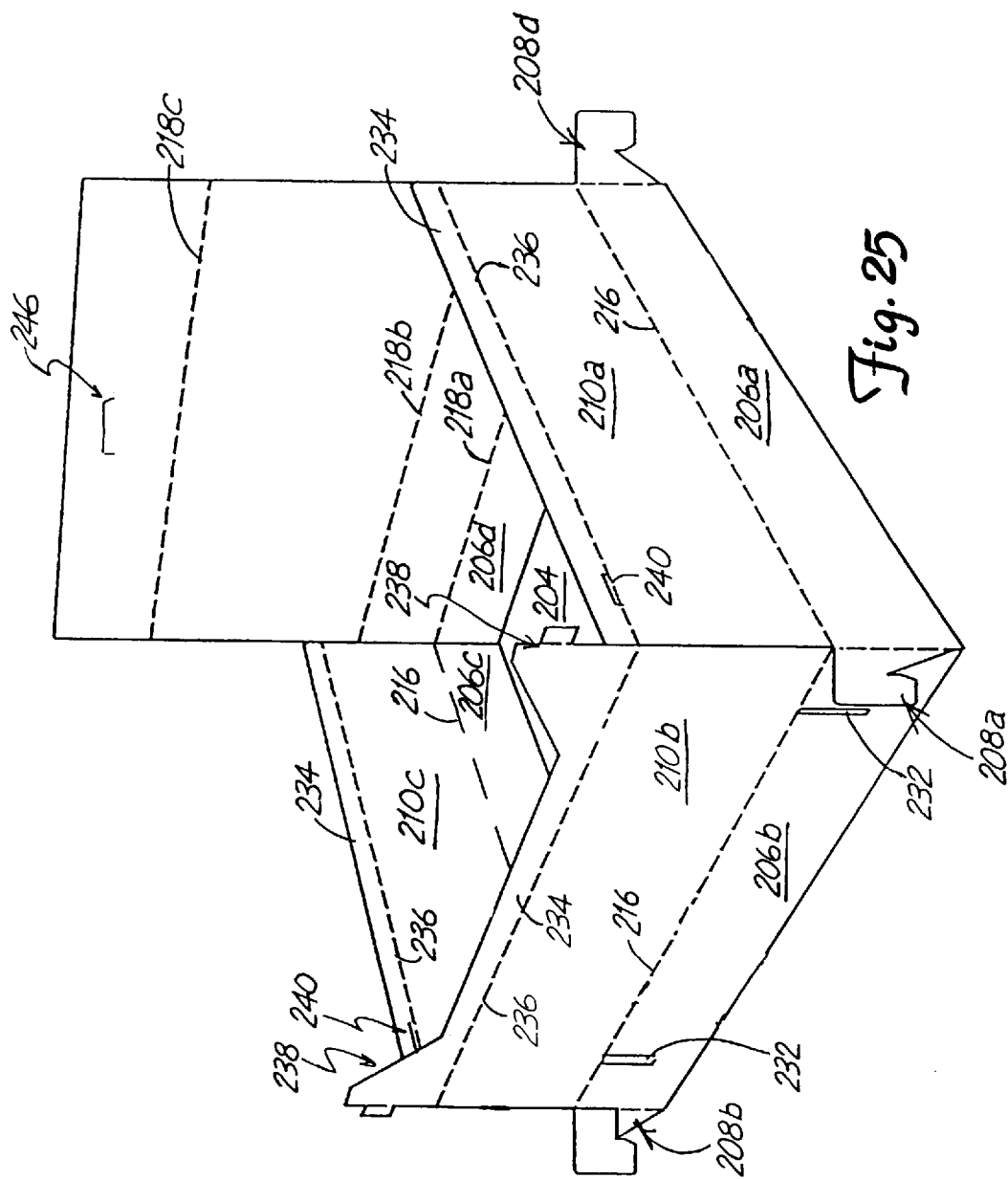
FIG. 25 is a perspective view illustrating the litter box of FIG. 23 in an assembled condition with container walls and barriers upright for use.

FIG. 25 is a perspective view of an expanded litter box 200 having container walls 206 and barriers 210 in the upright position for use. As shown, container walls 206a–206d are aligned in an upright position generally perpendicular to base 204 for operation. As shown, connection members 208a–d are aligned with slots 232 on adjacent container walls for detachably securing the container walls in an upright position. Additionally, as shown, barriers 210a–210c are aligned in an upright position, generally perpendicular to base 204 and are detachably secured in the upright position via connection members 238 and slots 240 on the rims 234 of adjacent barriers.

FIGS. 26A–26D illustrate connection of detachable connection members 208a–208d through slots 232 and an adjacent container wall to connect adjacent container walls in the upright position. To facilitate connection of adjacent container walls 206, the container walls are folded to the upright position and connection member 208a–208d are folded along foldable extent 222 so that tab portion 226 folds onto, and parallelly mates with tab portion 224 as shown in FIGS. 26A–26B. Locking member 230 extends from insertion flap 228 and is folded along foldable extent 258 between locking member 230 and flap 228 onto insertion flap 228 as illustrated by arrow 260 of FIG. 26B so that the locking member 230 does not interfere with insertion of flap 228 through slot 236. Thereafter, tab portions 224, 226 are folded along foldable extents 221, 222 as illustrated by arrow 262 of FIG. 26C.

Flap 228 is folded along foldable extent 264 between tab portion 224 and flap 228 to align flap 228 for insertion through slot 236 as illustrated in FIG. 26D. The length of the flap 228 corresponds to the length of the slot 236 so that the flap 228 may be inserted therethrough. After the flap 228 is inserted through slot 236, the locking member 230 is unfolded relative to flap 228 to extend from flap 228 to physically maintain flap 228 in slot 236.

As illustrated, preferably, tab portion 224 is integrally formed and hingedly coupled along entire height of the container wall and tab portion 226 is integrally formed and hingedly coupled along a portion of the height of an adjacent container wall. Thus, as described, a lower portion of tab portion 224 (i.e., portion that overlaps with or mates with portion 226) and tab portion 226 provide a continuous structure along a portion of adjacent container walls for a more fluid tight connection between adjacent container walls.

FIGS. 27A–27C are detailed illustrations of connection members 238 and slots 240 for detachably securing barriers 210a–210c in an upright position. As shown, connection members 238 are supported by rims 234 of barrier 210b at opposed sides thereof and slots 240 are formed on rims 234 of adjacent barriers 210a,c. Connection members 238 include a flap 270 and a locking member 272. Flap 270 is foldably coupled to rim 234 of barrier 210b by hingedly coupled extent 274 and locking member 272 extends from flap 270 and is hingedly coupled to flap 270 along foldable extent 276.

To secure adjacent barriers, locking member 272 is folded along extent 276 as illustrated by arrow 280 in FIG. 27A. Flap 270 is folded along extent 274 relative to rim 234 as illustrated by arrow 280 of FIG. 27B. Rim 234 of barriers 210a,c with slots 240 are folded along extent 236. Thereafter, rim 234 of barrier 210b with connection member 238 is folded along extent 236 as illustrated by arrow 282 in FIG. 27C to align flap 270 with slot 240 for insertion therethrough. In particular, flap 270 is sized similar to slot 240 for insertion and locking member 272 extends from flap 270 and is unfolded to physically secure the flap 270 within slot 240, as illustrated in phantom in FIG. 27C.

To release adjacent barriers, and to collapse barriers 210a–c for sealing the contents of the container after use, flap 270 is withdrawn from slot 240. To withdraw flap 270 from slot 240, locking member 272 is folded so that flap 270 fits through slot 240. As shown, preferably, rims 234 extend along the entire width of barriers 210a–c to provide enhanced structural support for the upright assembled litter box for use. Rim 234 of barrier 210b preferably includes extended rim portions at opposed ends of rim 234 to support connection members 238 for alignment with slots 240 as shown. Preferably, the extended rim portions are formed of a generally sloped edge to limit interference of rim 234 with the opening to the inner cavity of the litter box.

Figure 28:
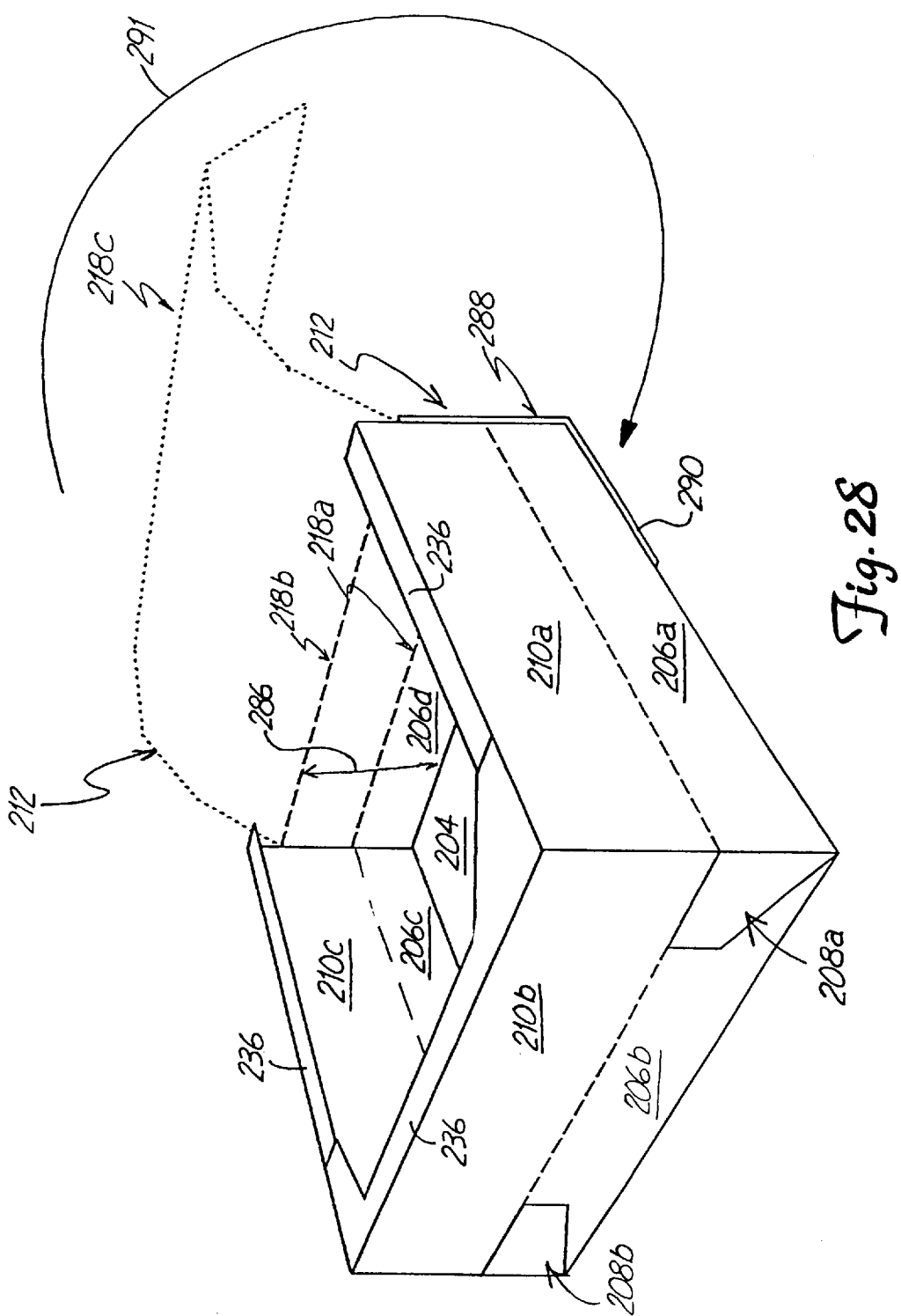
FIG. 28 is a perspective view of the litter box of FIG. 23 with barriers and container walls upright for use and illustrating positioning of a cover during use.
Figure 29:
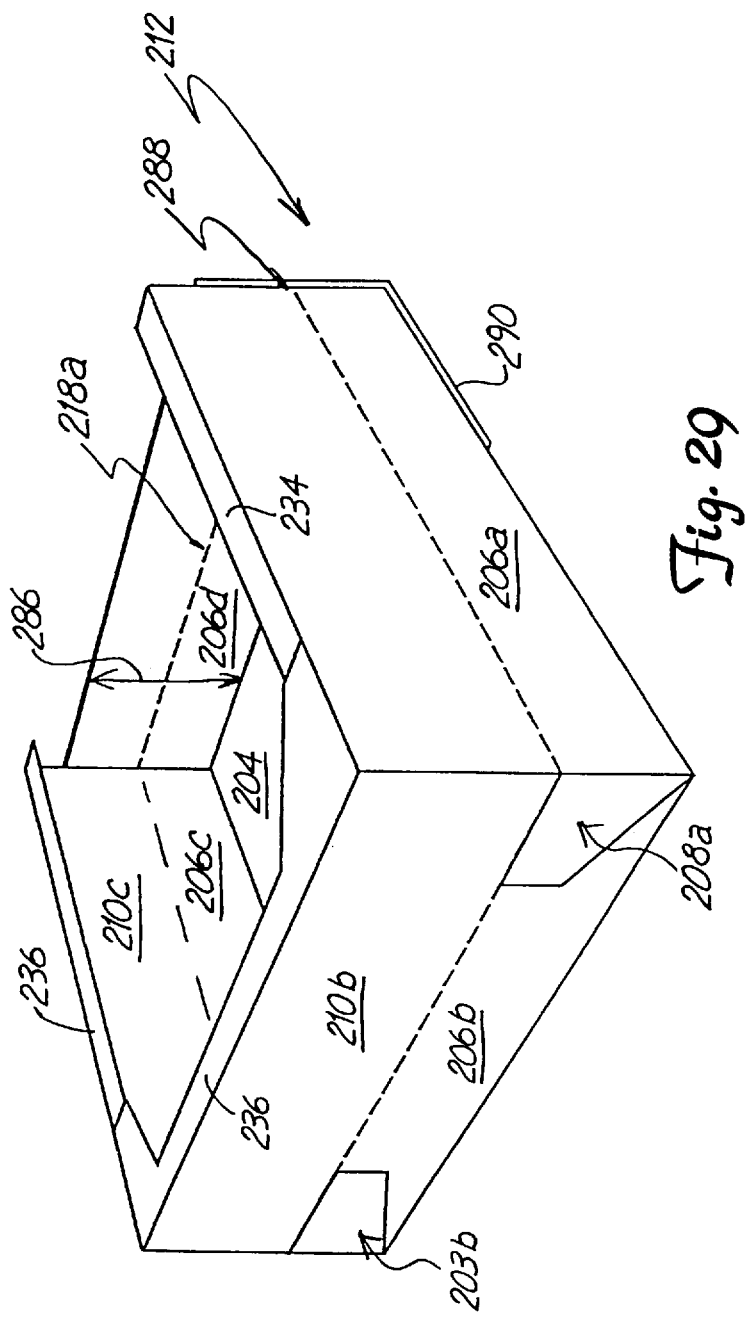
FIG. 29 is a perspective view similar to FIG. 28 with the cover shown folded back for use.

FIGS. 28–29 illustrate an assembled litter box with the barriers and container walls in an upright position for use by a household pet for waste disposal. As shown comparatively in FIGS. 28–29, cover 212 is folded under base 204 during use of the litter box. Cover 212 is folded along foldable extents 218a–c to define an adjustable height threshold 286 and first and second folded portions 288, 290. The first folded portion 288 extends along the height of the adjustable threshold 286 and the second folded portion 290 folds under base 204 to extend in parallel alignment with base 204. In particular, cover 212 is folded along spaced foldable extents 218a–c, as illustrated by arrow 291 in FIG. 28. For example, cover 212 is folded along extents 218a and 218b to define threshold 286 and first and second folded portions 288,290. Alternatively, cover 212 is folded along extents 218b and 218c to define a higher threshold 286 than the threshold defined by folded extent 218a. It should be understood that it is not necessary to form a second folded portion 290 for each height threshold. For example, the foldable extents may be spaced to define a foldable extent defining a threshold and only a first folded portion which extends along the length of the threshold along an outer surface of the container. It should also be understood that any number of foldable extents can be used, allowing for many threshold heights.

Figure 30:
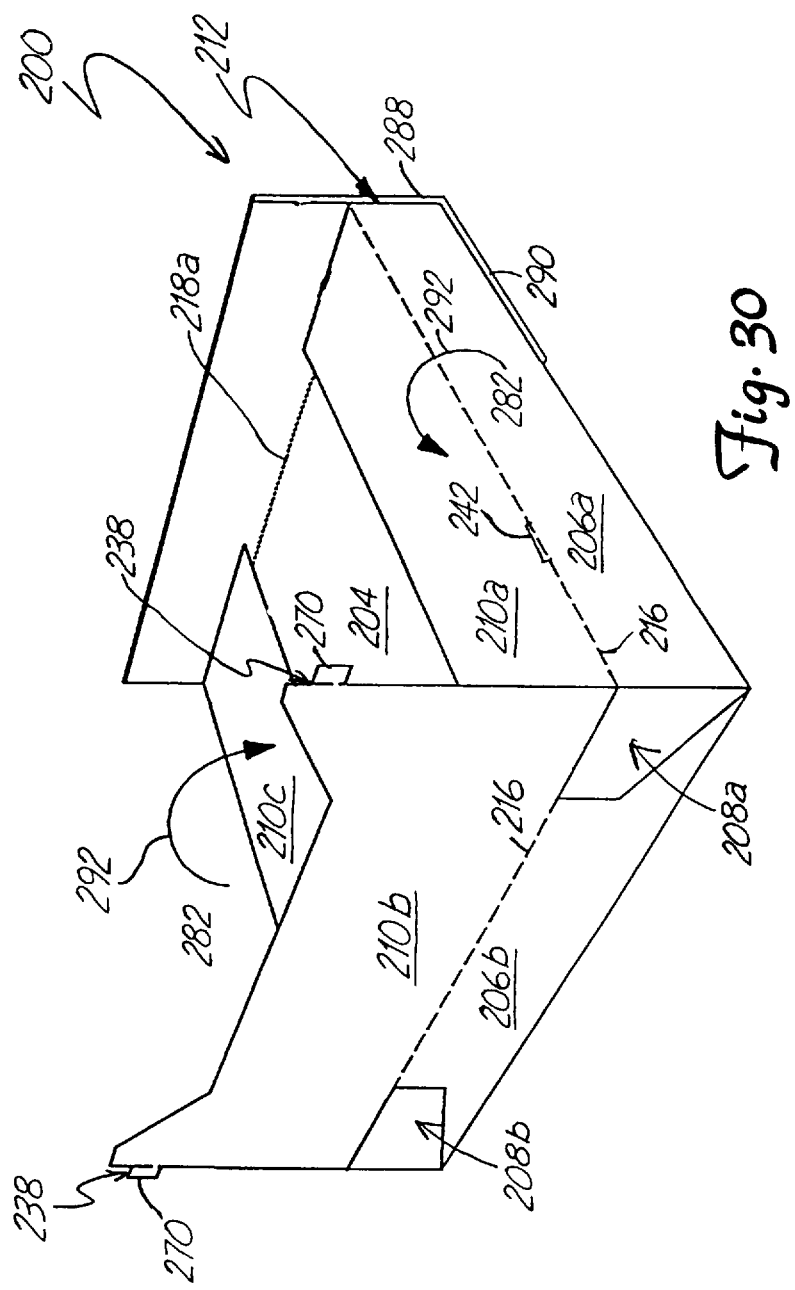
FIG. 30 is a perspective view illustrating barriers and cover being folded to close an inner cavity of the container of the embodiment of FIG. 23.
Figure 31:
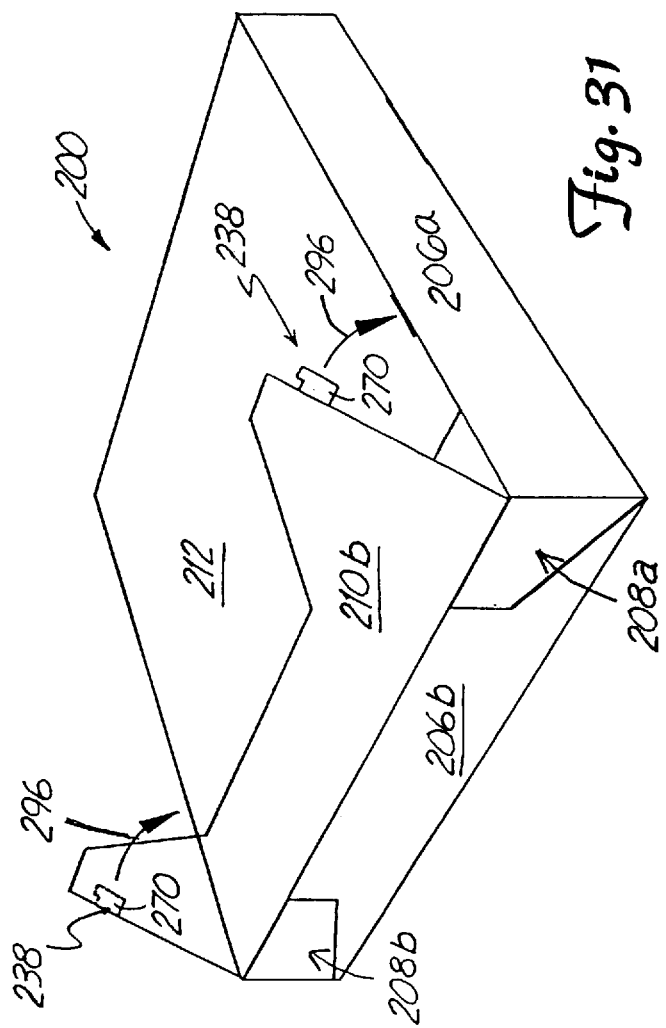
FIG. 31 is a perspective view similar to FIG. 30 illustrating connection of a barrier to the cover via connection members.

FIGS. 30–31 illustrate the container portion being closed for disposal. To close the container portion for disposal, barriers 210a–c are collapsed and folded along extent 216 and cover 212 is folded along extent 218a to close the opening to the inner cavity of the container. In particular, after use, connection members 238 are released from slots 240. Barriers 210a,c are folded along extent 216 in parallel spaced alignment with base 204 as illustrated by arrows 292 in FIG. 30. Thereafter first and second portions 288, 290 of cover 212 are unfolded and cover is folded about extent 218a. Recessed edges 294 as shown in FIG. 23 are formed on cover 212. Cover 212 is folded about extent 218a over folded barriers 210a,c and recessed edges 294 align with slots 242 on barriers 210a,c. Barrier 210b is folded along extent 216 over barriers 210a,c and cover 212. Flap 270 of connection members 238 are inserted into slots 242 as illustrated by arrows 296 of FIG. 31 for securing the container portion closed for disposal. Preferably, additionally, connection member 248 on barrier 210b, shown in FIG. 23, are inserted into slot 246 on cover 212, shown in FIG. 23, for securing the cover to close the inner cavity of the container.

Figure 32:
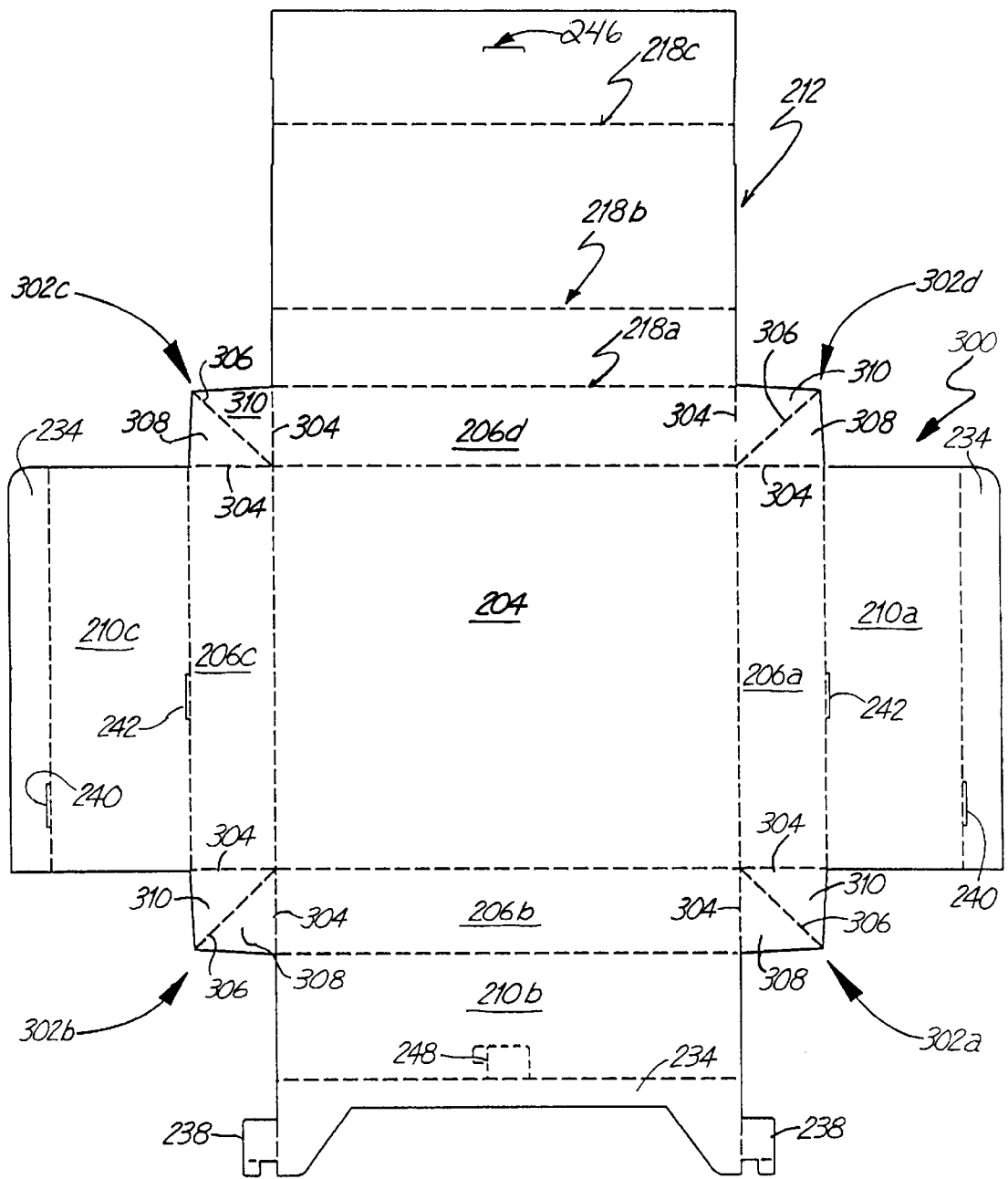
FIG. 32 is a plan view of another unassembled embodiment of a litter box of the present invention.

FIGS. 32–33 illustrate an alternate embodiment of a litter box 300 similar to the litter box 200 illustrated in FIGS. 23–31 and similar numbers are used to illustrate similar parts of FIGS. 23–31. However, connection members 302a–d for connecting adjacent container walls 206a–d differ from tabs 208a–d and are similar to connection members 108a–d of the litter box 100 of FIGS. 15–22. Similar to connection members 108a–d, connection members 302a–d are integrally formed with and foldably coupled to adjacent container walls via foldable extents 304.

Figure 33A:
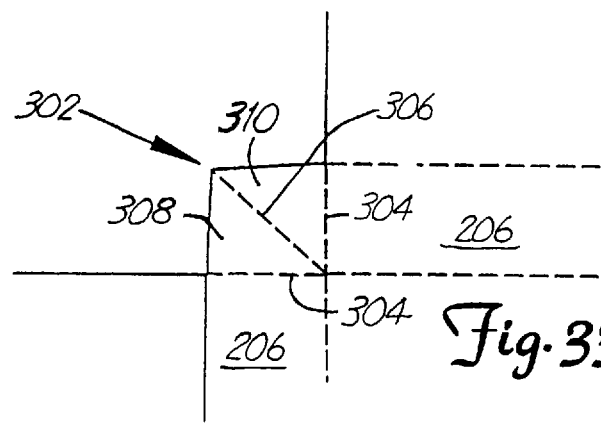
FIGS. 33A–33D illustrate operation of tabs for connecting adjacent container walls of the litter box of FIG. 32.
Figure 33B:
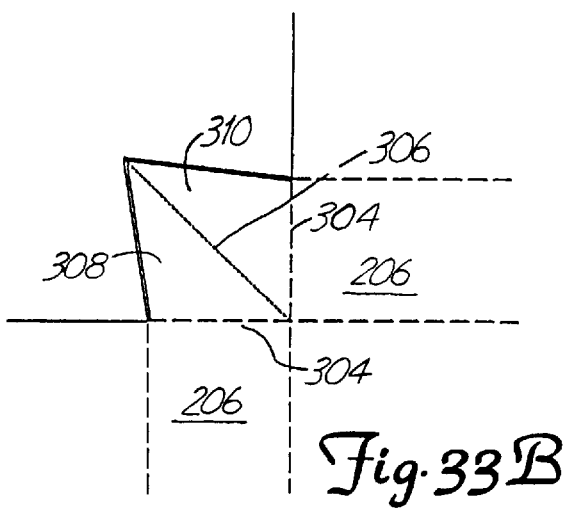
Figure 33C:
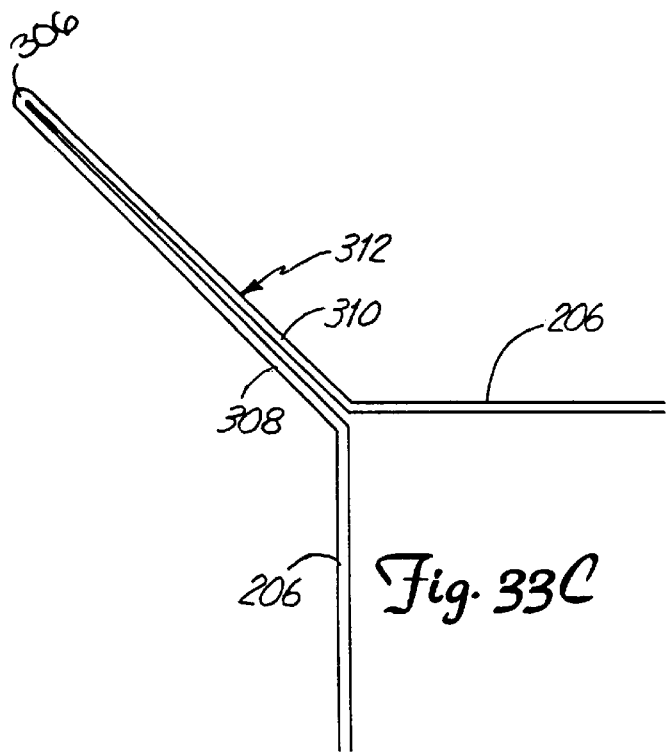
Figure 33D:
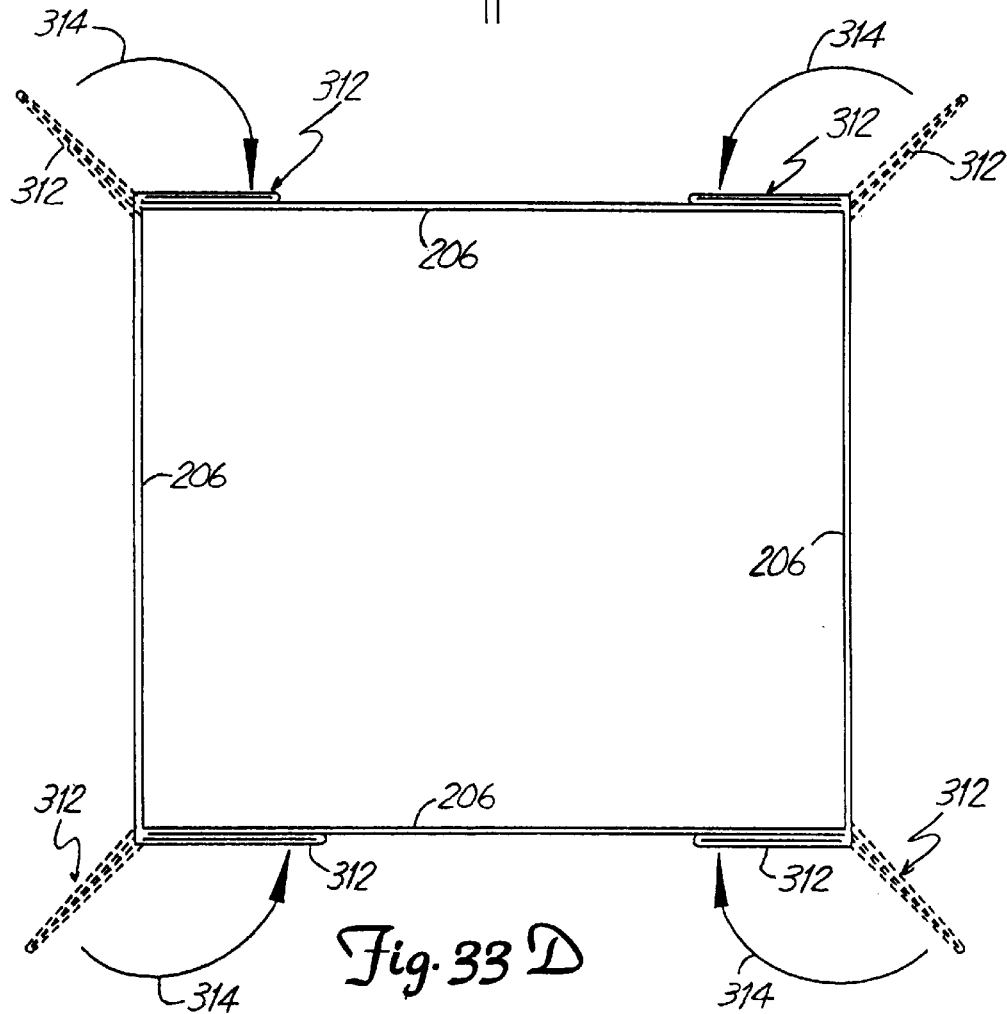

As shown, connection members 302a–d include a diagonal hinge formed by foldable extent 306 defining first and second tab portions 308, 310 which are folded to secure container walls in the upright position. Tab portions 308, 310 may be folded inwardly along extent 306 and extent 304, as illustrated in FIGS. 17A–B or outwardly as illustrated in FIGS. 33B–D. Tab portions 308, 310 are folded to mate in face to face relation to form folded tab portion 312 as shown in FIG. 33C. Folded tab portion 312 is then moved as illustrated by arrow 314 and secured to a container wall. Preferably, folded tab portion 312 is permanently secured to the container wall via an adhesive or staples, or alternatively, may be detachable secured to the container wall. Thus, connection members 302a–d define a continuous and integrally formed structure between adjacent container walls to eliminate leakage gaps. It should be understood that connection members 302a–d may be folded inwardly or outwardly and secured to an inner or outer surface of the container walls, as illustrated in FIGS. 17A–17B and FIGS. 33A–33D. Thus, folded tab portion 312 may be permanently secured to maintain container walls in the upright position, to define a litter box which can be sold with or without litter in the inner cavity of the container.

Although the present invention has been described with reference to preferred embodiments, workers skilled in the art will recognize that changes may be made in form and detail without departing from the spirit and scope of the invention.

What is claimed is:

1. A litter container comprising:
   a base;
   container walls hingedly coupled to the base to move between an upright position and a folded position relative to said base in the upright position, the container walls forming a container having an opening to an inner cavity of the container;
   a cover hingedly coupled to container walls and movable to a folded position generally parallel to said base to close the opening to the inner cavity of the container;
   a plurality of barriers lock hingedly coupled to adjacent container walls to move between an upright position and a folded position generally parallel to said base, the container walls and barriers being movable to the upright positions generally perpendicular to said base for use, the barrier and cover being movable to the folded position to close the opening of the container formed by the container walls in the upright position; and
   means for selectively raising container walls and barriers to the upright position and collapsing the container walls and barriers along a hinged connection between the container walls and the base so that the container walls, base, and barriers are collapsed to form a generally flat structure.

2. The litter container of claim 1 wherein adjacent container walls are permanently connectable to form the container, and the means for selectively collapsing the container walls and barriers comprises:
   diagonally-placed hinges extending along the height of barriers and container walls on opposed sides of the container between an exposed edge of the barriers and the hinged connection between the container walls and the base.

3. The litter container of claim 1 wherein the means for selectively collapsing the container walls and barriers comprises:
   detachable connection members coupled to adjacent container walls for releasably securing the container walls between the upright position and a collapsed position for collapsing the container walls and barriers.

4. The litter container of claim 2 wherein adjacent container walls are permanently connected by a continuous tab structure comprising:
   a tab member having generally perpendicularly-arranged sides formed integrally with and foldably coupled to sides of adjacent container walls, said tab member including a central hinge to form opposed tab portions, said tab portions being folded along the central hinge to position adjacent container walls in the upright position to form a continuous structure between adjacent side walls.

5. The litter container of claim 1 wherein the cover includes:
   a series of spaced, foldable extents for providing an adjustable height threshold to the inner cavity of the container.

6. The litter container of claim 5 wherein the cover is foldable along a first foldable extent to define the threshold and foldable along a second foldable extent for folding a remaining extent of the cover out of the way of the opening to the inner cavity of the container.

7. The litter container of claim 1, including at least four container walls to form a rectangular-shaped container portion.

8. The litter container of claim 1 wherein the litter container is formed of an integral sheet of material.

9. The litter container of claim 1 wherein the cover includes at least one adhesive strip along a surface thereof adapted to secure the cover to close the opening of the container.

10. The litter container of claim 1 wherein the container is formed of a corrugated cardboard material.

11. A litter container comprising:
    a base;
    container walls hingedly coupled to the base to form a container having an opening to an inner cavity of the container;
    a cover hingedly coupled to a container wall and movable to a folded position generally parallel to the base to close the opening to the inner cavity of the container;
    tab members having generally perpendicularly-arranged sides formed integrally with and foldably coupled to sides of adjacent container walls, said tab members including a central hinge to form opposed tab portions, the tab members being folded along the central hinge to secure adjacent container walls in the upright position to form a continuous structure between adjacent side walls.

12. The litter container of claim 11 and further comprising:
    barriers hingedly coupled to container walls to move between an upright position and a folded position generally parallel to the base;
    detachable connection members for detachably securing the barriers in the upright position; and
    the cover including a plurality of spaced foldable extents for providing an adjustable height threshold for entry to an inner cavity of the container.

13. The litter container of claim 12 wherein the barriers include rim portions hingedly coupled to the barriers, the connection members being operably coupled to the rim portions.

14. The litter container of claim 11 wherein the barriers include rim portions hingedly coupled to the barriers, the rim portions of the barriers including detachable connection members for detachably securing the barriers in the upright position.

15. A unitary sheet adapted for constructing a litter container comprising:

a base portion having a plurality of sides;

a plurality of first wall portions foldably coupled to and extending from the sides of the base portion along foldable extents, the wall portions being foldable along foldable extents for moving the first wall portions to an upright position relative to the base portion for assembly;

a plurality of second wall portions foldably coupled to and extending from extended sides of the first wall portions along foldable extents;

a cover hingedly coupled to and extending from an extended side of one of said first wall portions along a foldable extent between the first wall portion and cover for foldably connecting the cover and the first wall portion;

connection members coupled to adjacent first wall portions for detachably connecting adjacent first wall portions in the upright assembled position and a collapsed position; and connection members coupled to adjacent second wall portions for detachably connecting adjacent second wall portions in an upright position and a folded closed position.

16. A method for assembly of a litter container comprising the steps of:

providing a litter container having container walls selectively foldable between a collapsed position where the container walls are generally parallel to a base of the litter container and an upright position for defining an inner cavity of the container;

raising the container walls to the upright position generally perpendicular to the base to assemble the litter container for use;

providing barriers extending from and hingedly coupled to adjacent container walls having detachable connection members for detachably connecting barriers between an upright position and a folded position; and detachably connecting the barriers in the upright position.

17. The method of claim 16 and further comprising the steps of:

folding barriers relative to container walls so that the barriers extend in generally parallel relation to the base;

providing a cover foldably coupled to a container wall; and folding the cover to close an opening to the inner cavity of the container formed by the base and container walls.

* * * * *